US012044043B2

(12) United States Patent
Jeong

(10) Patent No.: US 12,044,043 B2
(45) Date of Patent: Jul. 23, 2024

(54) ELECTRIC LATCH FOR VEHICLE DOOR

(71) Applicant: Woobo Tech Co., Ltd., Pyeongtaek-si (KR)

(72) Inventor: Hae Il Jeong, Incheon (KR)

(73) Assignee: WOOBO TECH CO., LTD., Pyeongtaek-si (KR)

(*) Notice: Subject to any disclaimer, the term of this patent is extended or adjusted under 35 U.S.C. 154(b) by 297 days.

(21) Appl. No.: 17/622,976

(22) PCT Filed: Apr. 16, 2021

(86) PCT No.: PCT/KR2021/004786
§ 371 (c)(1),
(2) Date: Dec. 27, 2021

(87) PCT Pub. No.: WO2021/215746
PCT Pub. Date: Oct. 28, 2021

(65) Prior Publication Data

US 2022/0259899 A1 Aug. 18, 2022

(30) Foreign Application Priority Data

Apr. 21, 2020 (KR) ........................ 10-2020-0048098

(51) Int. Cl.
*E05B 81/20* (2014.01)
*E05B 79/20* (2014.01)
(Continued)

(52) U.S. Cl.
CPC .............. *E05B 81/20* (2013.01); *E05B 79/20* (2013.01); *E05B 81/06* (2013.01); *E05B 81/18* (2013.01); *E05B 81/70* (2013.01); *E05B 85/02* (2013.01)

(58) Field of Classification Search
CPC .......... E05B 81/20; E05B 79/20; E05B 81/06; E05B 81/18; E05B 1/70; E05B 85/02
See application file for complete search history.

(56) References Cited

U.S. PATENT DOCUMENTS 5,918,917 A * 7/1999 Elton ...................... E05B 81/20 292/201
6,079,767 A * 6/2000 Faubert ................. E05F 15/646 296/155
(Continued)

FOREIGN PATENT DOCUMENTS

CN 105604410 A 5/2016
CN 106639686 A 5/2017
(Continued)

OTHER PUBLICATIONS

International Searching Authority/KR, International Search Report and Written Opinion of the International Searching Authority, Application No. PCT/KR2021/004786, mailed Aug. 6, 2021.
(Continued)

*Primary Examiner* — Mark A Williams
(74) *Attorney, Agent, or Firm* — Sunstein LLP

(57) ABSTRACT

An electric latch for vehicle door is disclosed. The electric latch for vehicle door includes an actuator installed in the vehicle door, a latch part installed in the vehicle door, a pusher part installed in the vehicle door, an actuator driver installed in the actuator, a pull member performing a sliding motion by the actuator driver, a cinching connector that is connected to one side of the pull member and the latch part and transmits a driving force of the actuator to the latch part, and a pusher connector that is connected to other side of the pull member and the pusher part and transmits the driving force of the actuator to the pusher part. The pull member selectively transmits the driving force of the actuator to the latch part or the pusher part.

2 Claims, 24 Drawing Sheets

(51) Int. Cl.

| | |
|---|---|
| ***E05B 81/06*** | (2014.01) |
| ***E05B 81/18*** | (2014.01) |
| ***E05B 81/70*** | (2014.01) |
| *E05B 85/02* | (2014.01) |

(56) References Cited

U.S. PATENT DOCUMENTS

| | | | | |
|---|---|---|---|---|
| 6,123,372 | A * | 9/2000 | Rogers, Jr. | E05B 79/20 292/201 |
| 6,247,373 | B1 * | 6/2001 | Bree | G01L 1/26 73/865.9 |
| 6,321,488 | B1 * | 11/2001 | Bigoszewski | E05F 15/638 49/362 |
| 2006/0066114 | A1 * | 3/2006 | Oberheide | F16D 11/14 292/199 |
| 2008/0072498 | A1 * | 3/2008 | Rogers | E05F 15/646 49/360 |
| 2008/0073917 | A1 * | 3/2008 | Ciavaglia | E05B 81/20 292/201 |
| 2016/0060922 | A1 * | 3/2016 | Clark | E05B 81/25 292/144 |
| 2016/0281400 | A1 * | 9/2016 | Byun | E05B 79/20 |
| 2016/0362916 | A1 * | 12/2016 | Tomaszewski | E05B 81/06 |
| 2017/0284134 | A1 * | 10/2017 | Schwickerath | E05B 81/21 |
| 2018/0345765 | A1 * | 12/2018 | Magazzini | E05B 81/25 |
| 2019/0003214 | A1 * | 1/2019 | Cumbo | E05B 81/25 |
| 2019/0063117 | A1 * | 2/2019 | Mozola | E05B 81/14 |
| 2019/0284849 | A1 * | 9/2019 | Ilea | E05B 81/54 |

FOREIGN PATENT DOCUMENTS

| | | | |
|---|---|---|---|
| CN | 110735568 | A | 1/2020 |
| EP | 3375959 | A1 | 3/2018 |
| JP | 4681275 | B2 | 5/2011 |
| JP | 2012-007319 | A | 1/2012 |
| KR | 10-2008-0061625 | A | 7/2008 |
| KR | 10-1972508 | B1 | 4/2019 |
| KR | 10-2019-0062494 | A | 6/2019 |
| KR | 10-1995346 | B | 7/2019 |
| KR | 10-2059334 | B1 | 12/2019 |
| KR | 10-2020-0038007 | A | 4/2020 |

OTHER PUBLICATIONS

Korean Intellectual Property Office, Office Action, Application No. 10-2020-0048098, mailed Aug. 31, 2021, 4 pages (in Korean).

Chinese Patent Office, Office Action, Application No. 202180004551.3, mailed Jun. 6, 2022, 6 pages (in Chinese).

Korean Intellectual Property Office, Notice of Allowance, Application No. 10-2020-0048098, mailed Dec. 28, 2021, 5 pages (in Korean).

* cited by examiner

[Fig. 1]
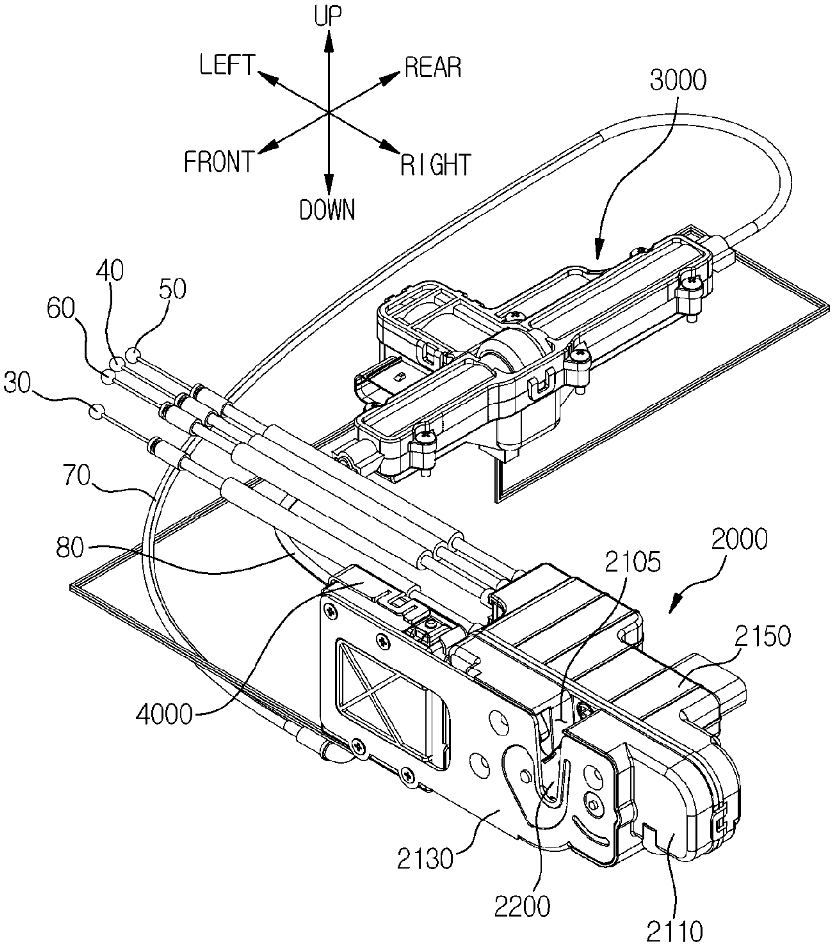
[Fig. 2]
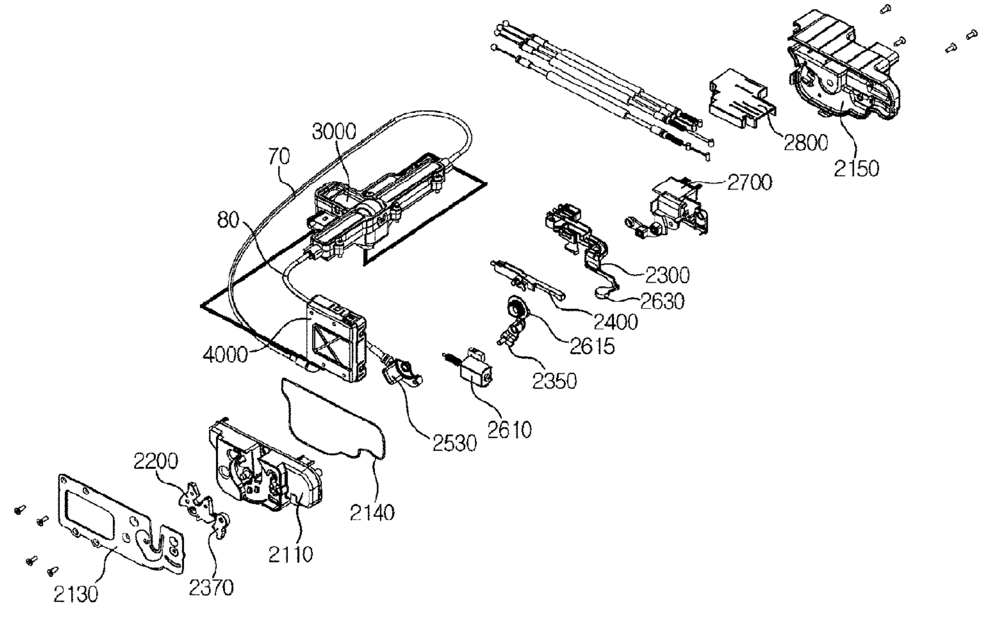

[Fig. 3]
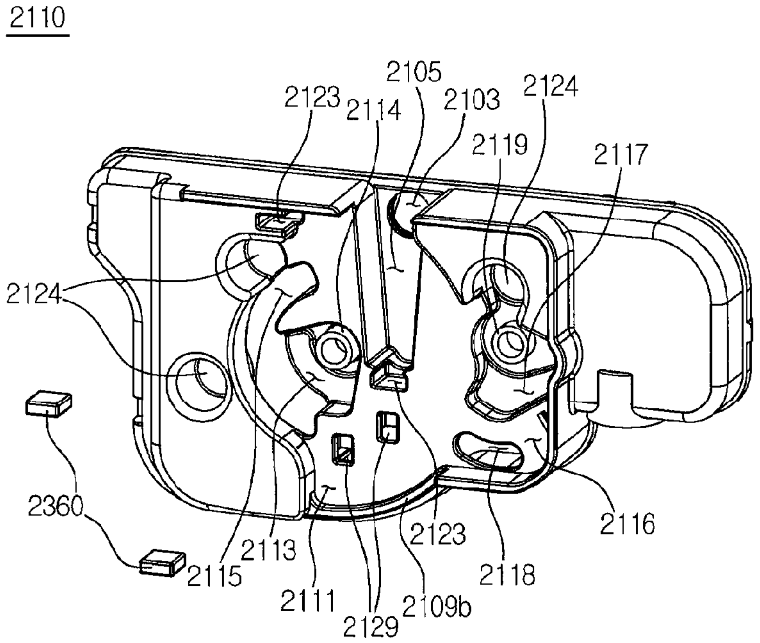
[Fig. 4]
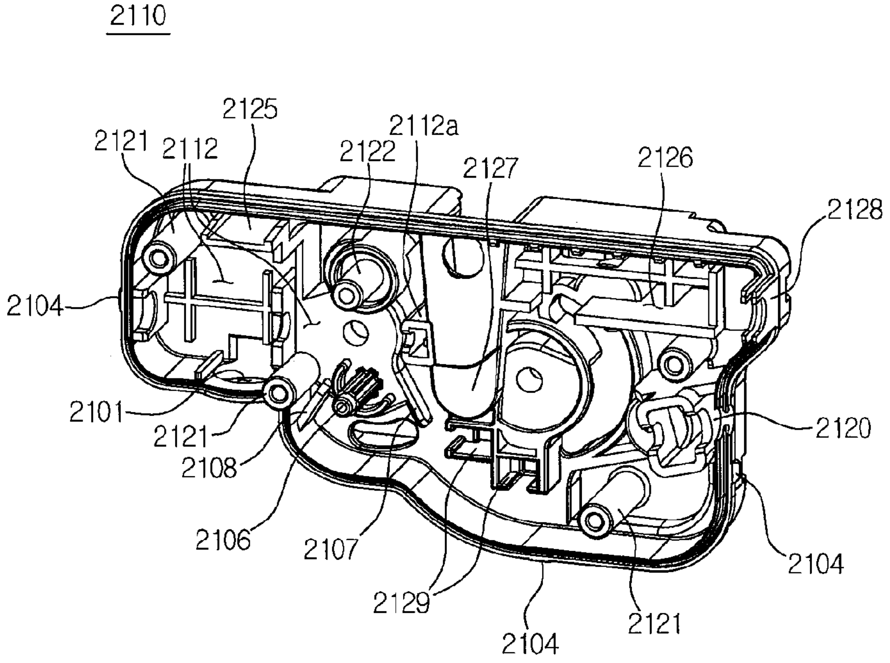

[Fig. 5]
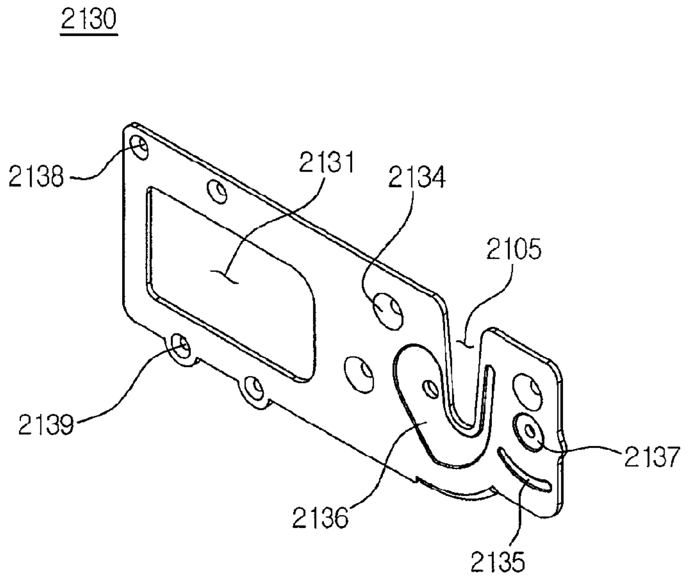
[Fig. 6]
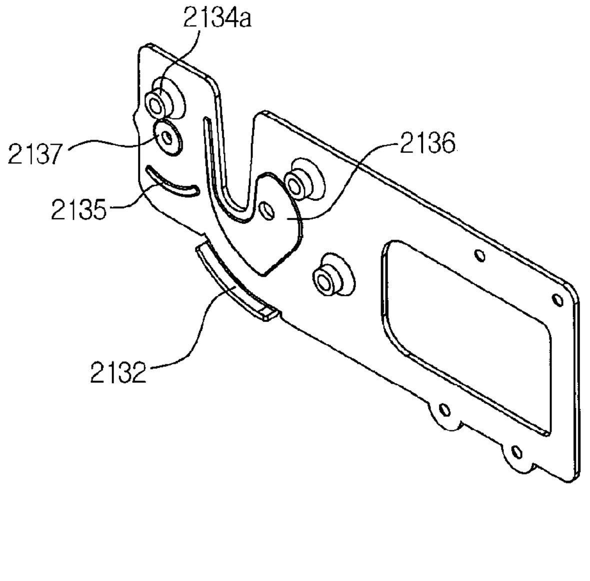

[Fig. 7]
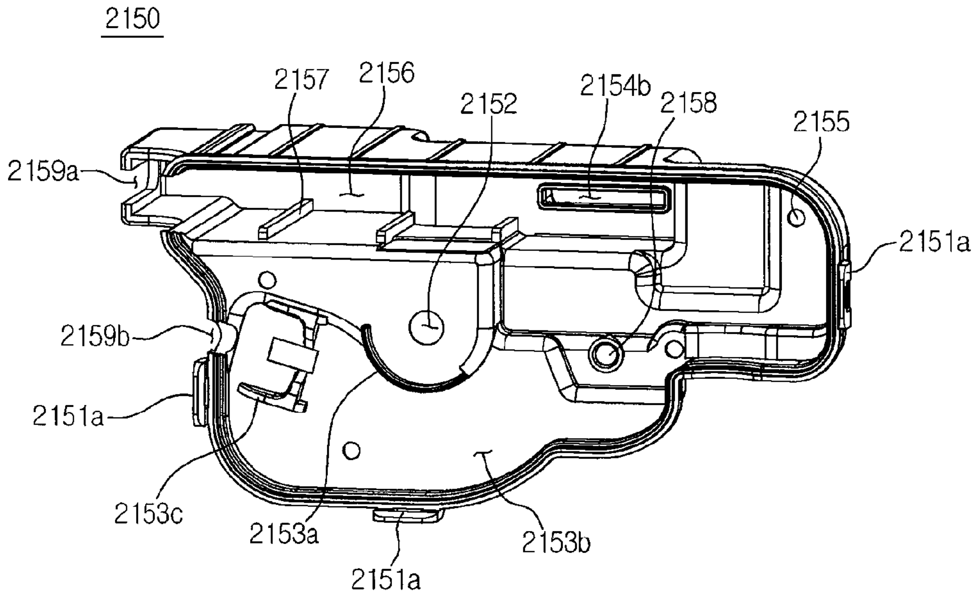
[Fig. 8]
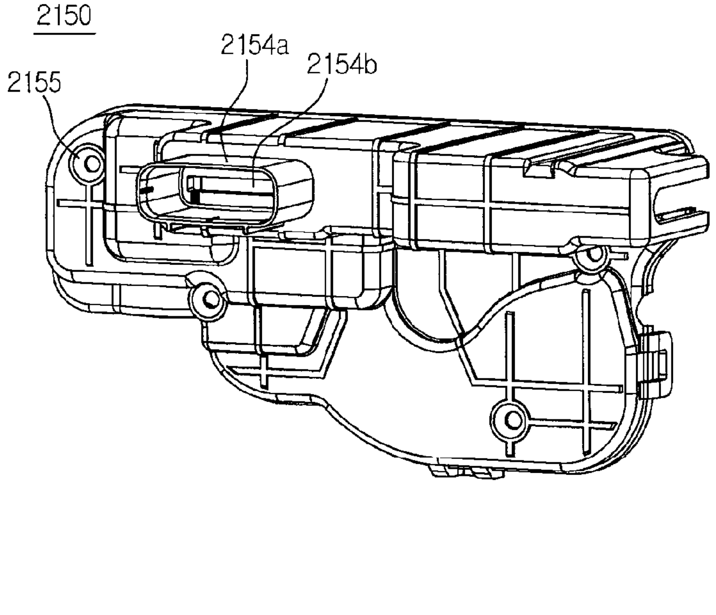

[Fig. 9]
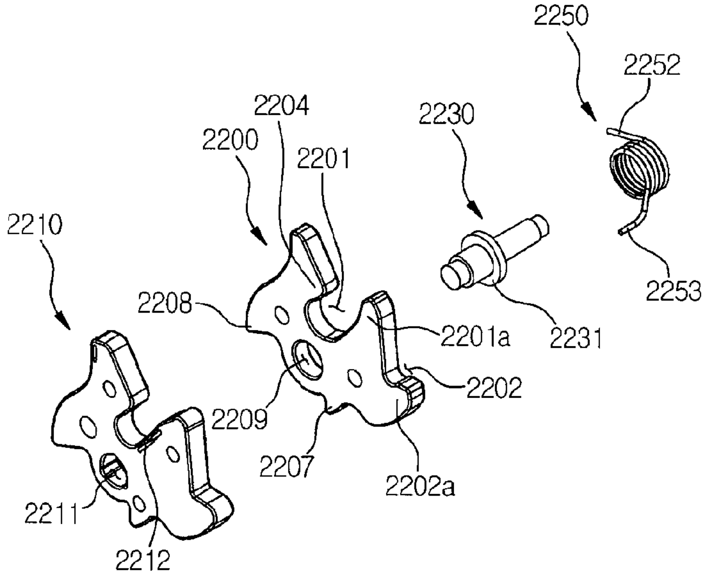
[Fig. 10]
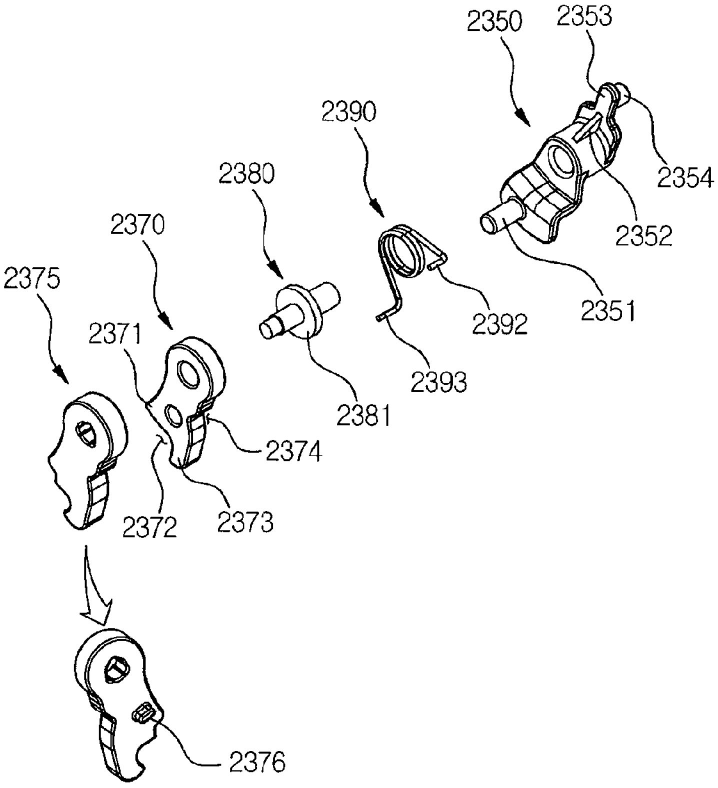

[Fig. 11]
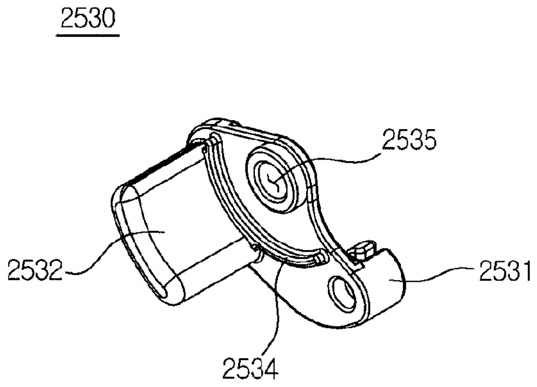
[Fig. 12]
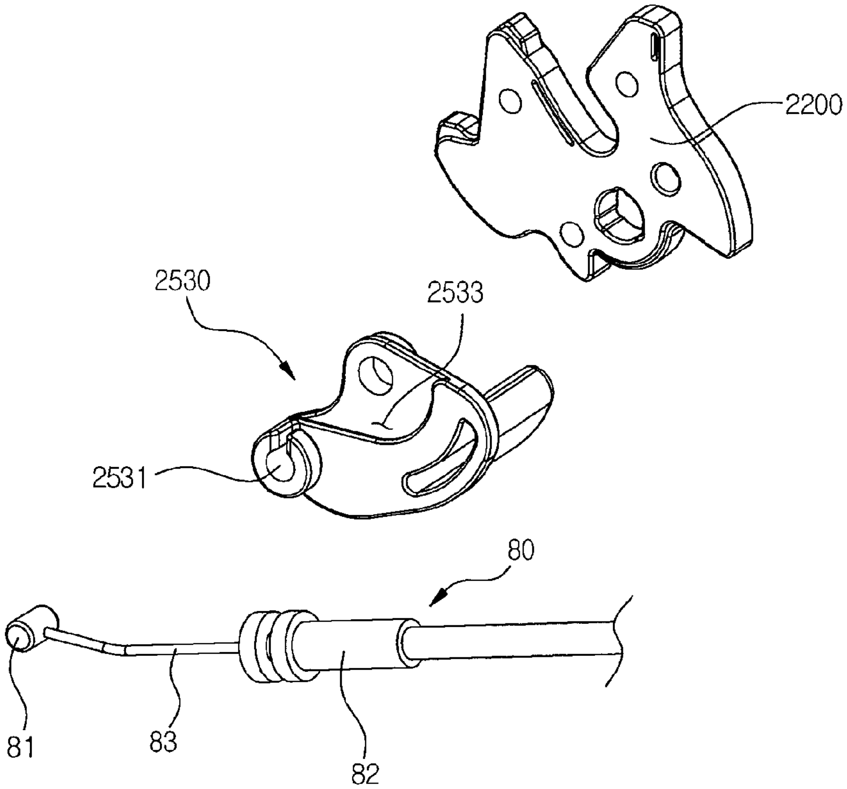

[Fig. 13]
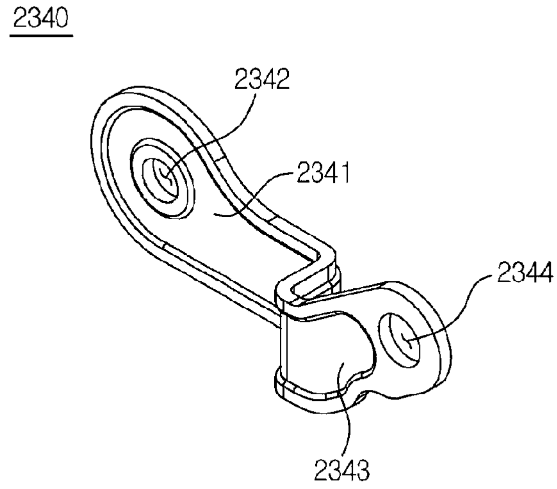
[Fig. 14]
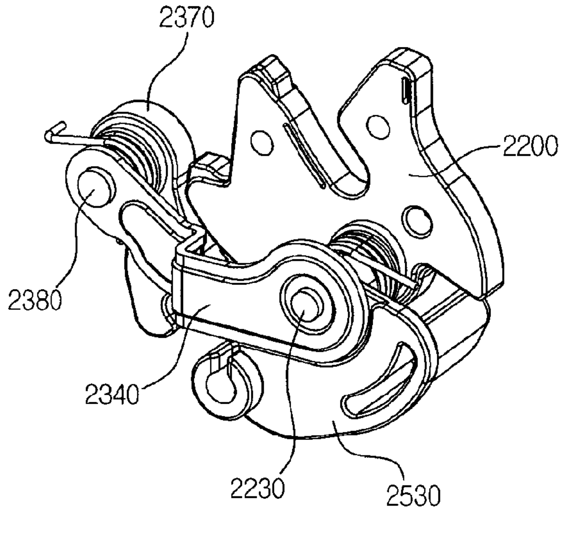

[Fig. 15]
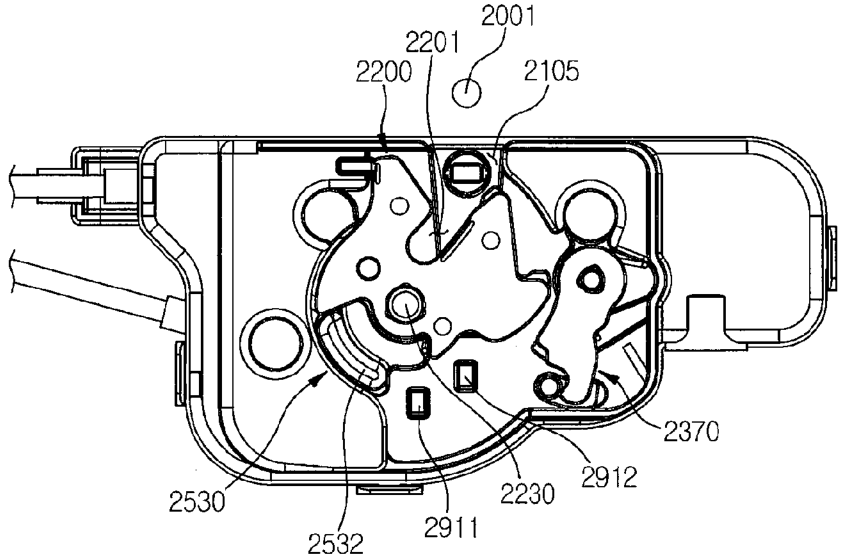
[Fig. 16]
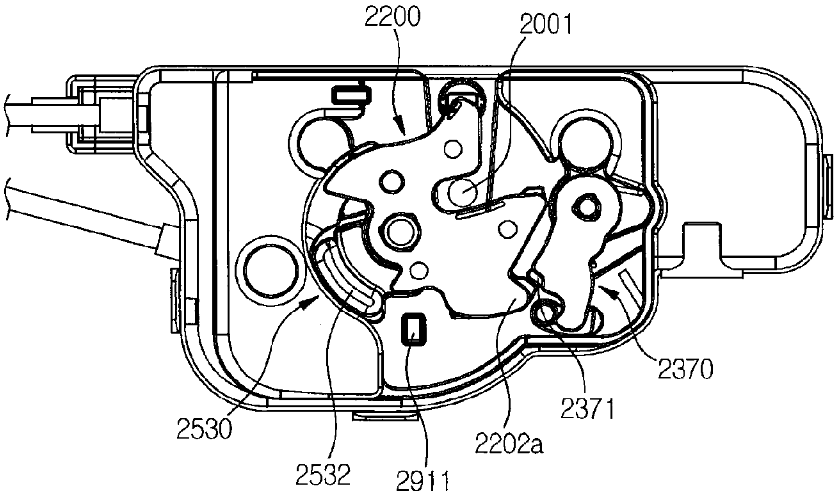
[Fig. 17]
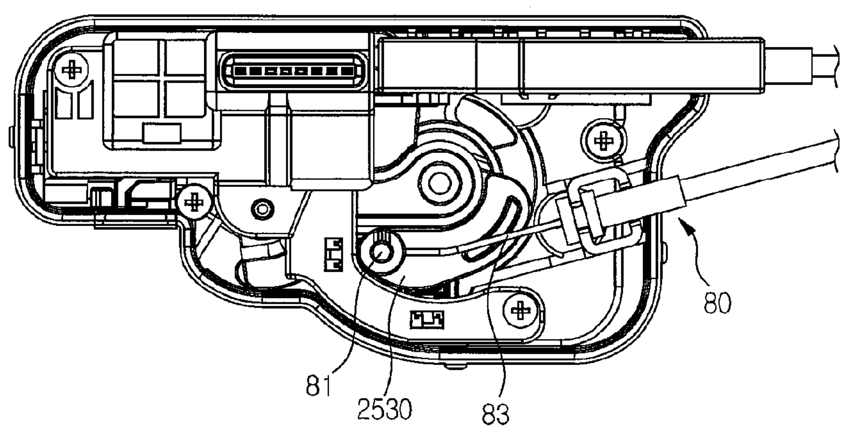

[Fig. 18]
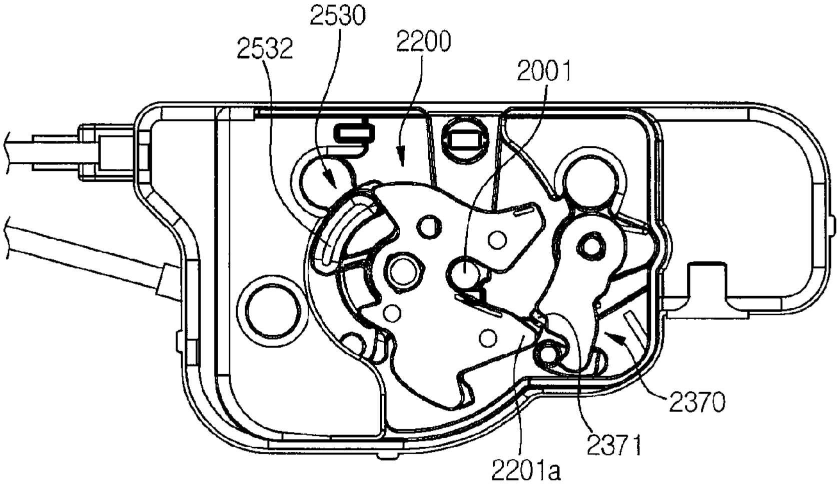
[Fig. 19]
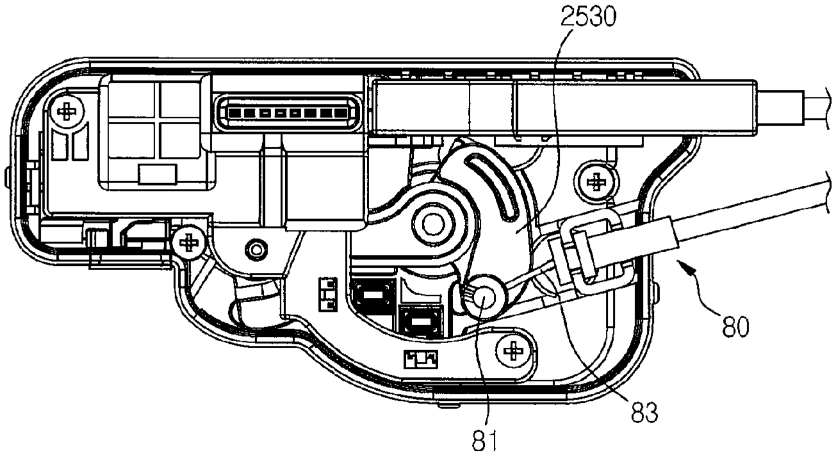

[Fig. 20]
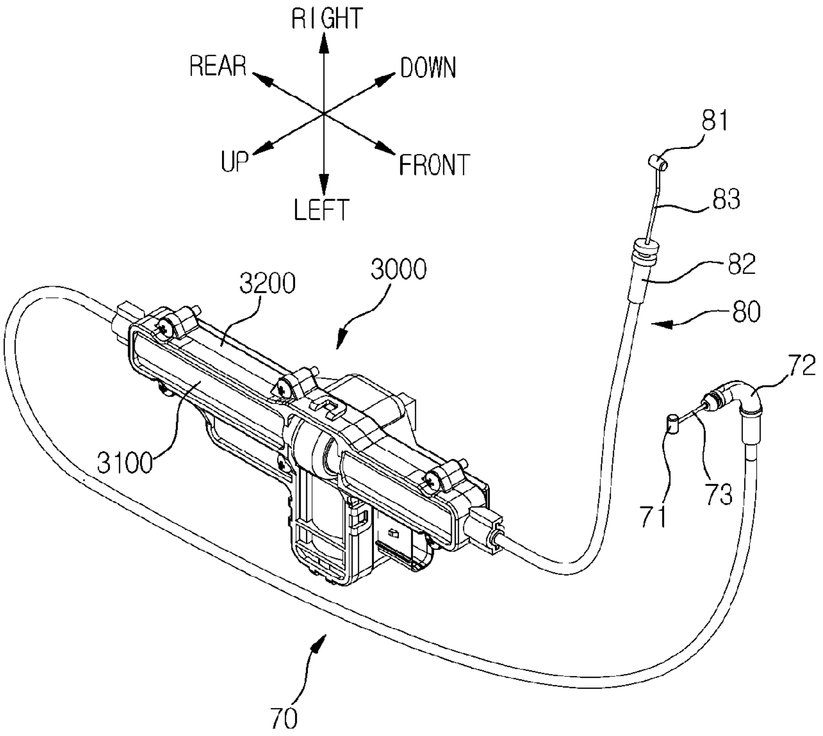
[Fig. 21]
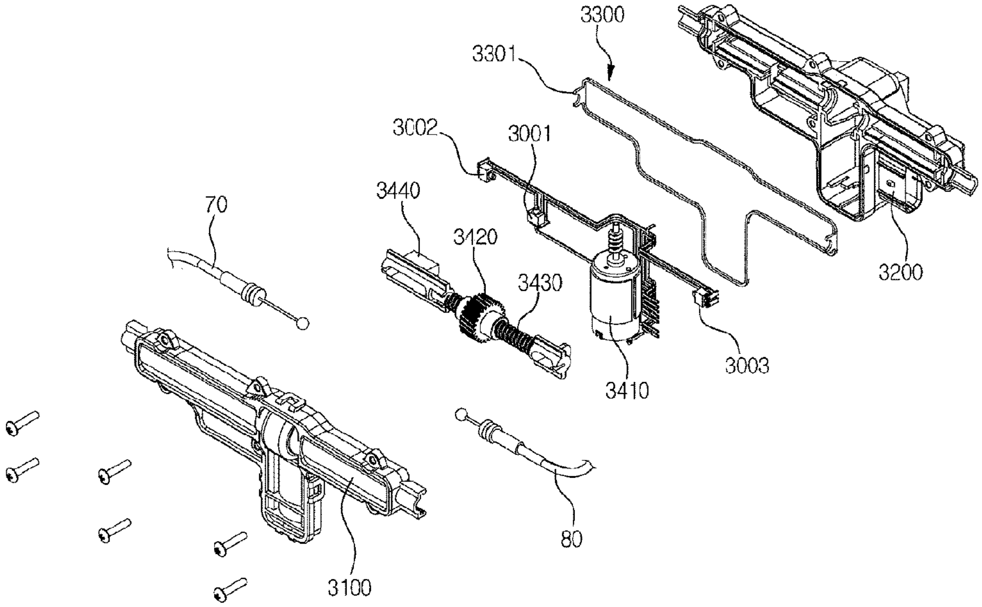

[Fig. 22]
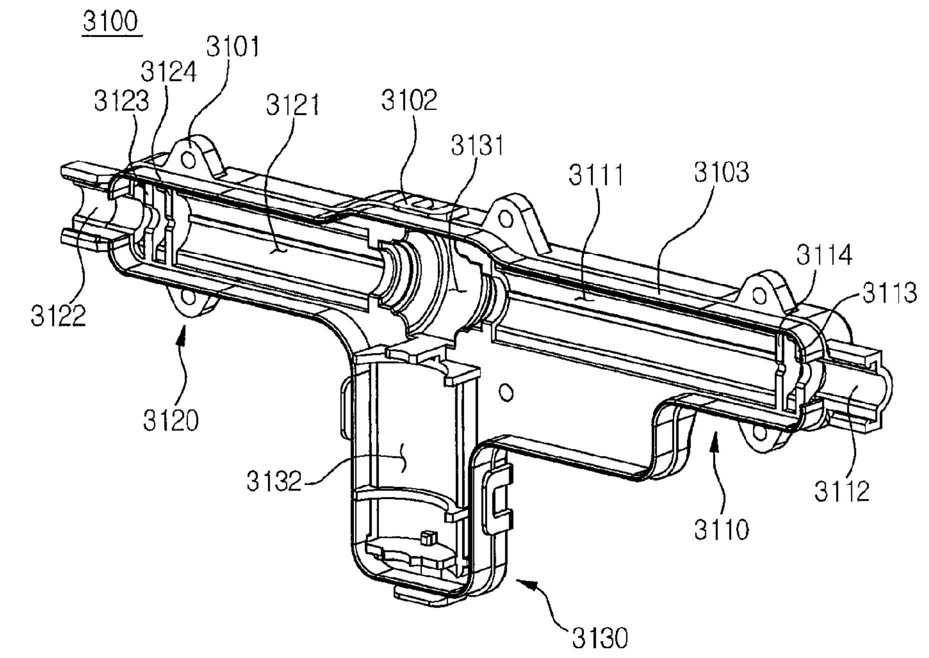
[Fig. 23]
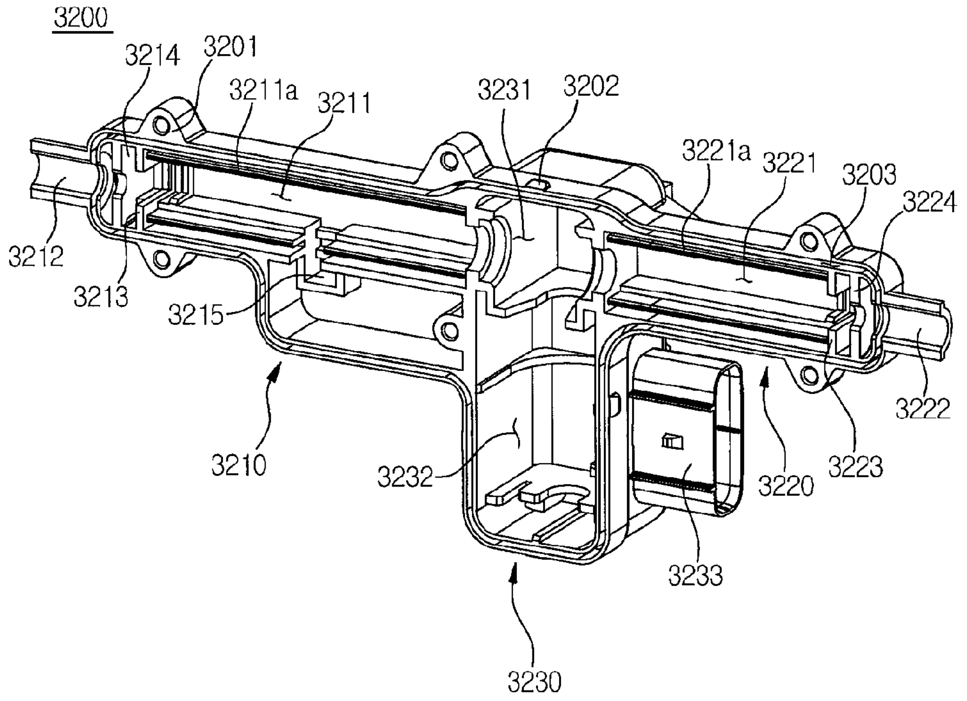

[Fig. 24]
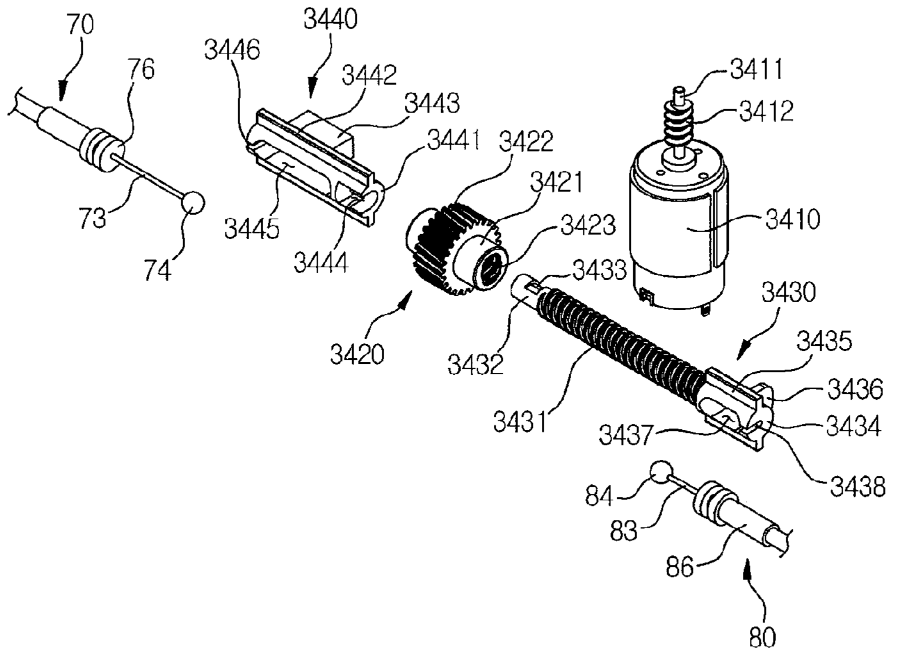
[Fig. 25]
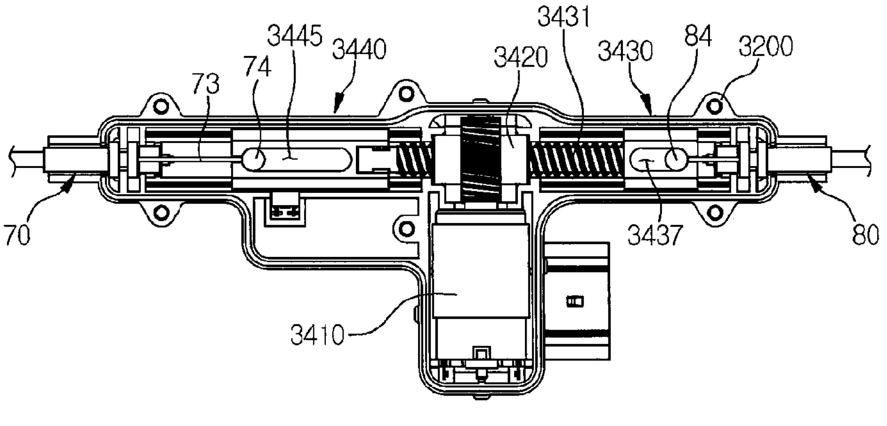
[Fig. 26]
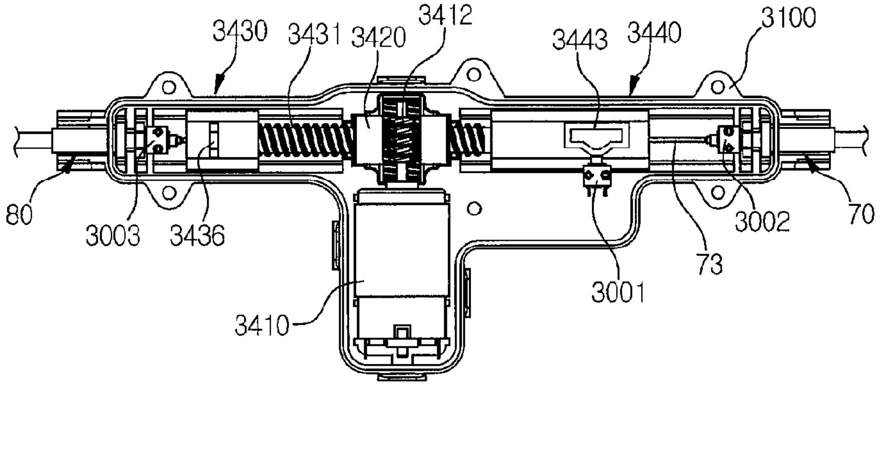

[Fig. 27]
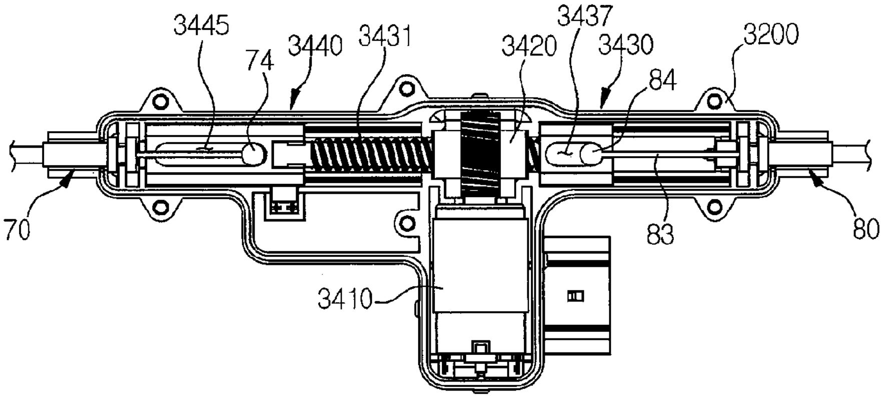
[Fig. 28]
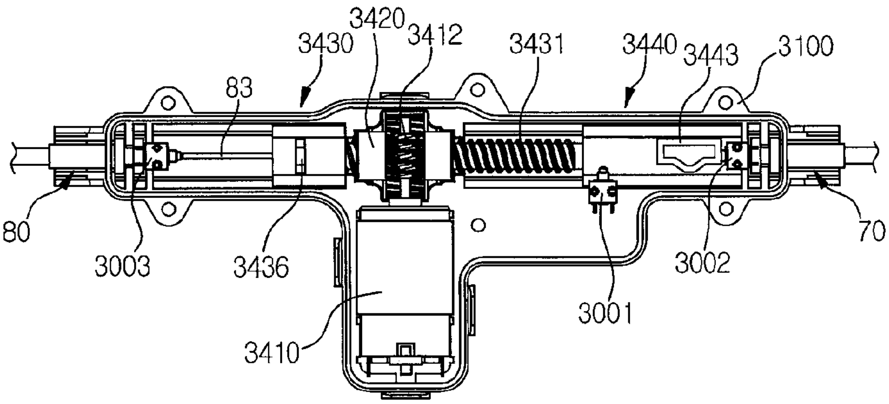
[Fig. 29]
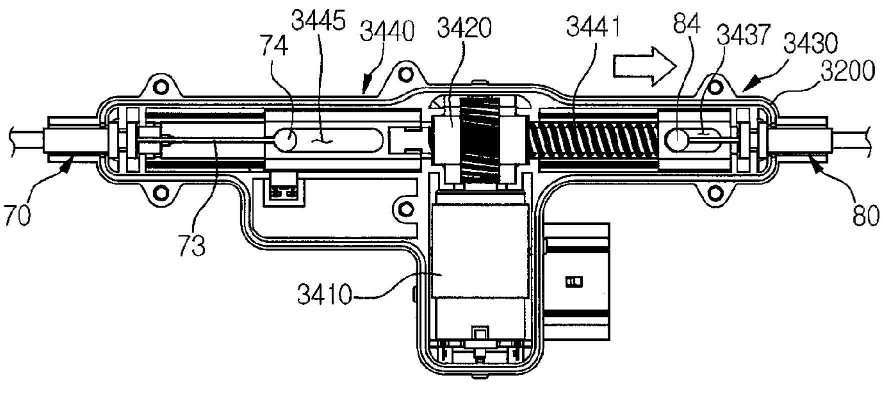

[Fig. 30]
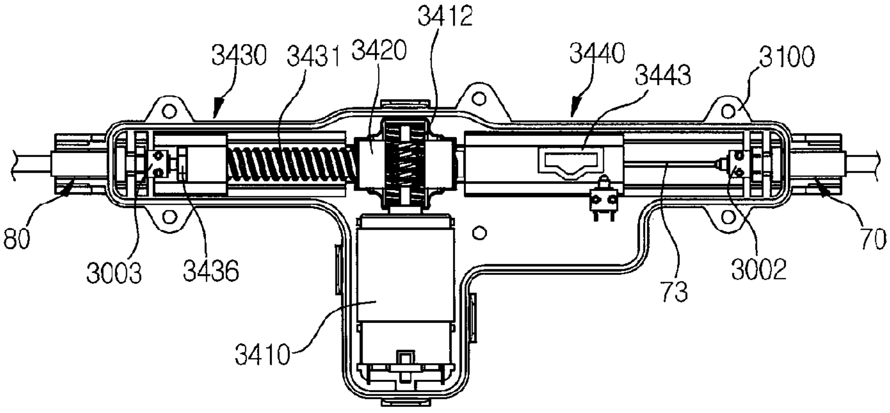
[Fig. 31]
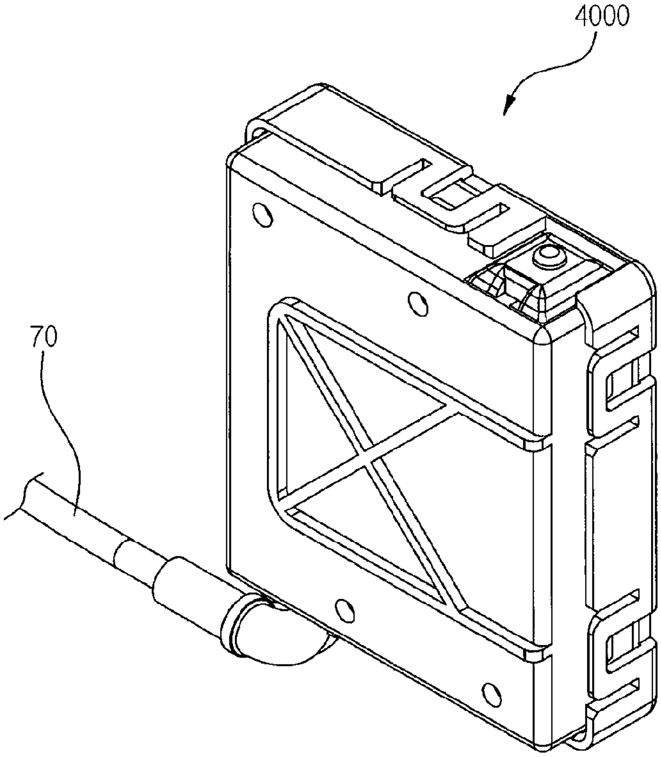

[Fig. 32]
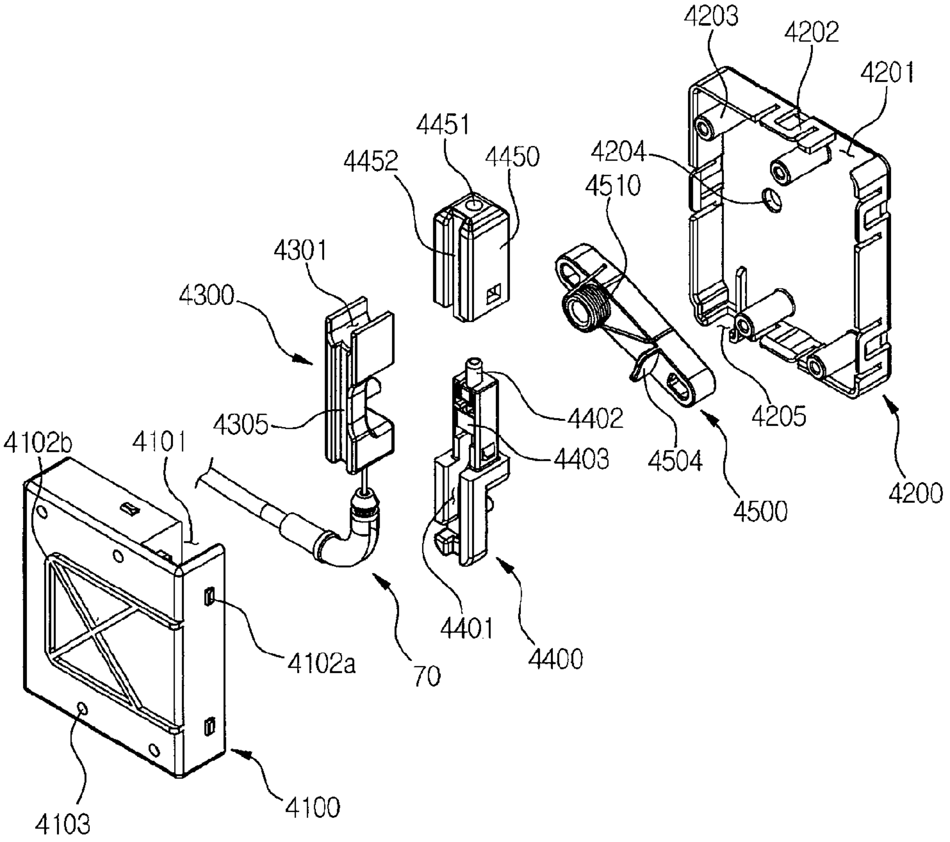

[Fig. 33]
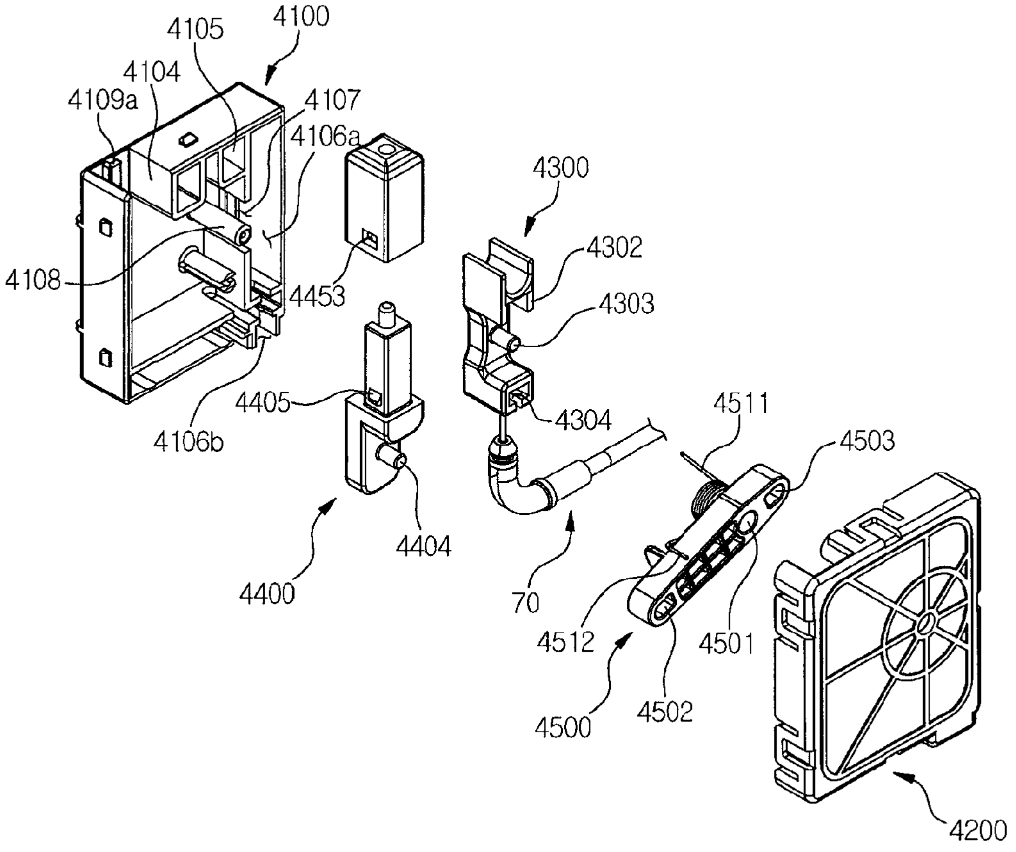

[Fig. 34]
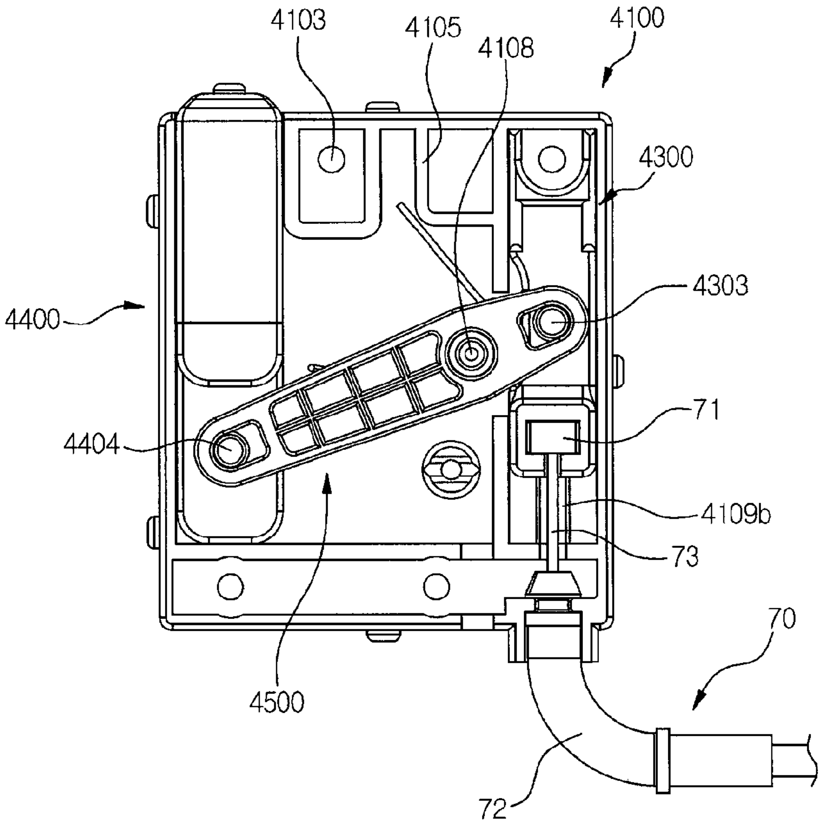

[Fig. 35]
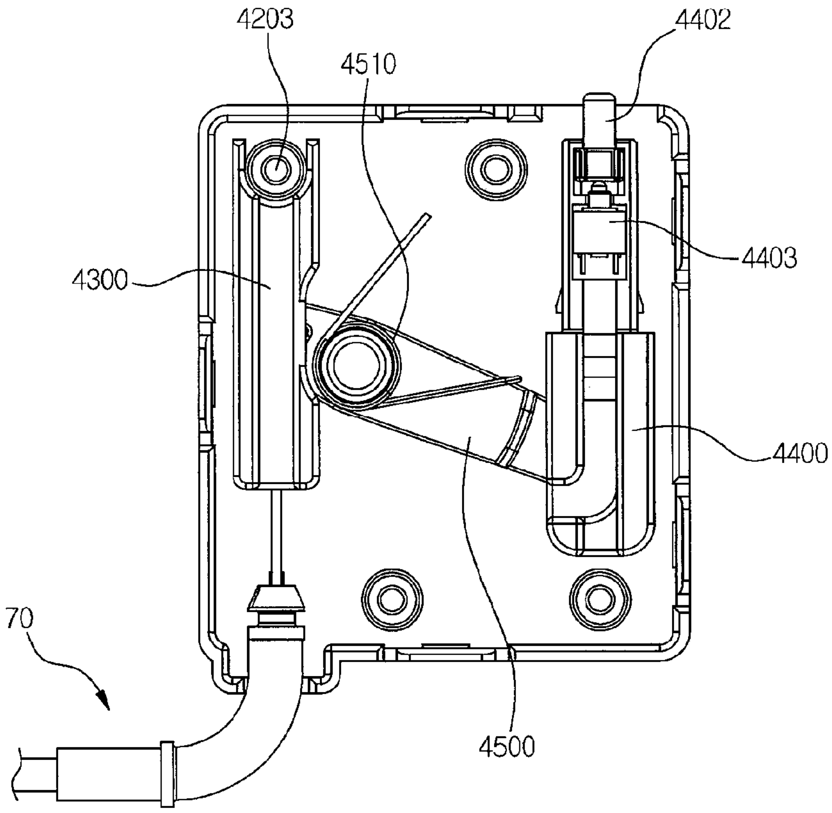

[Fig. 36]
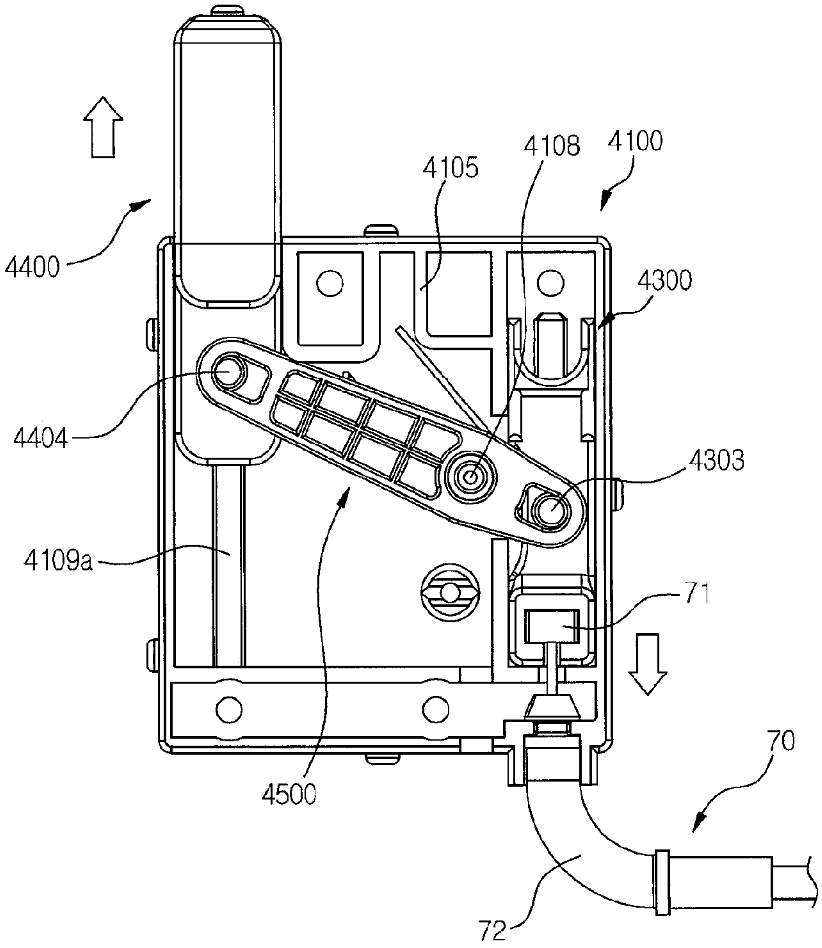

[Fig. 37]
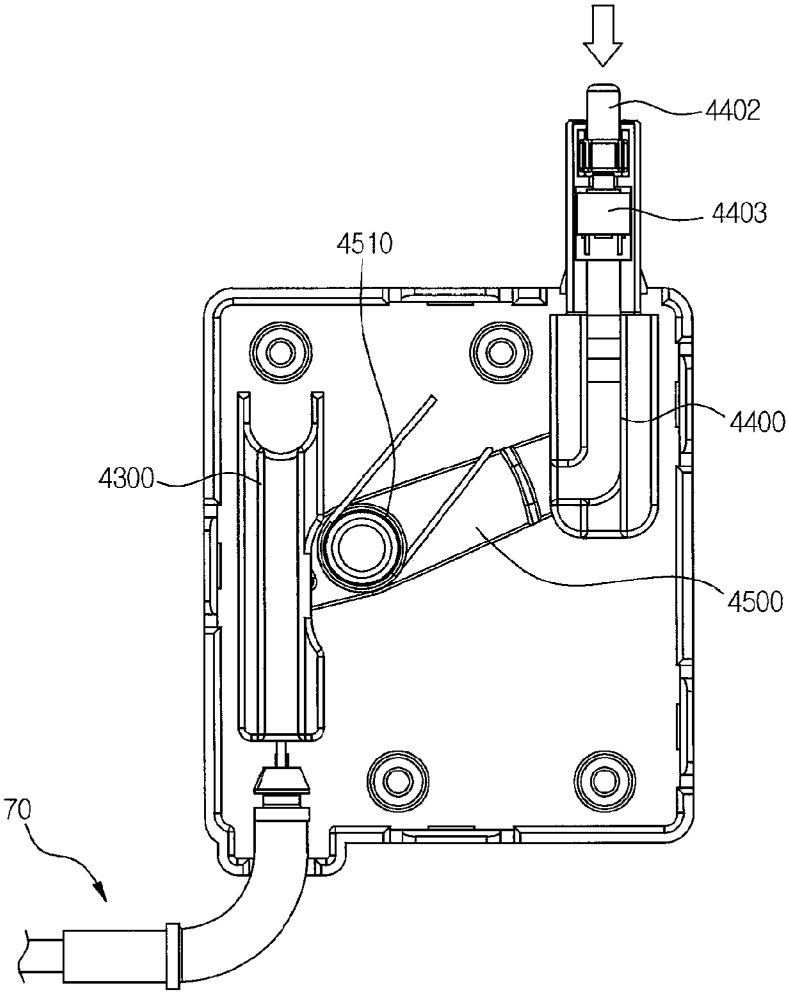

[Fig. 38]
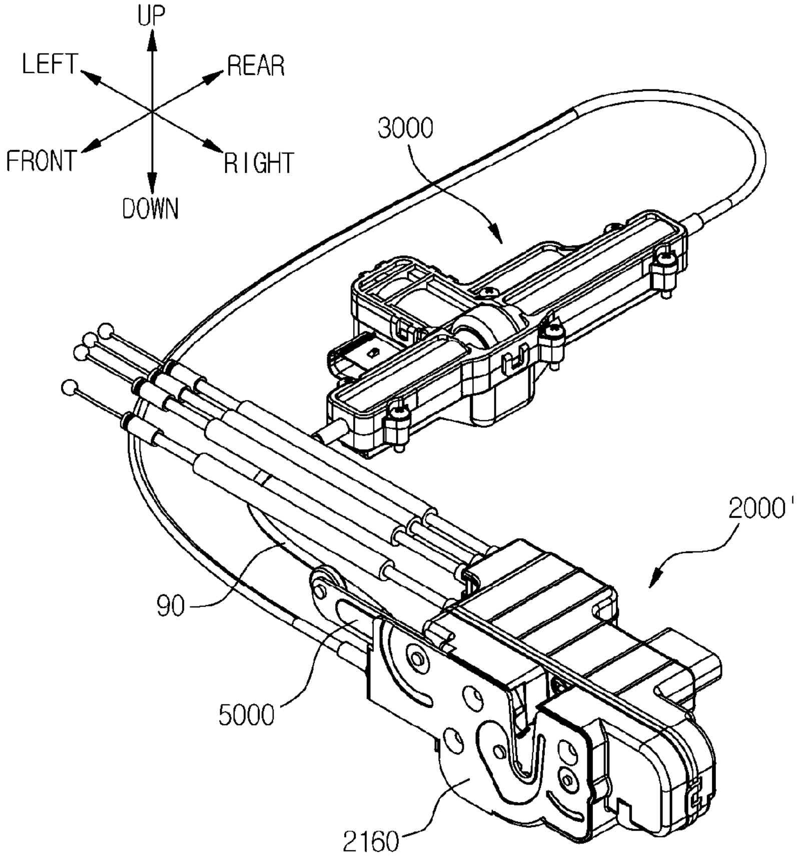

[Fig. 39]
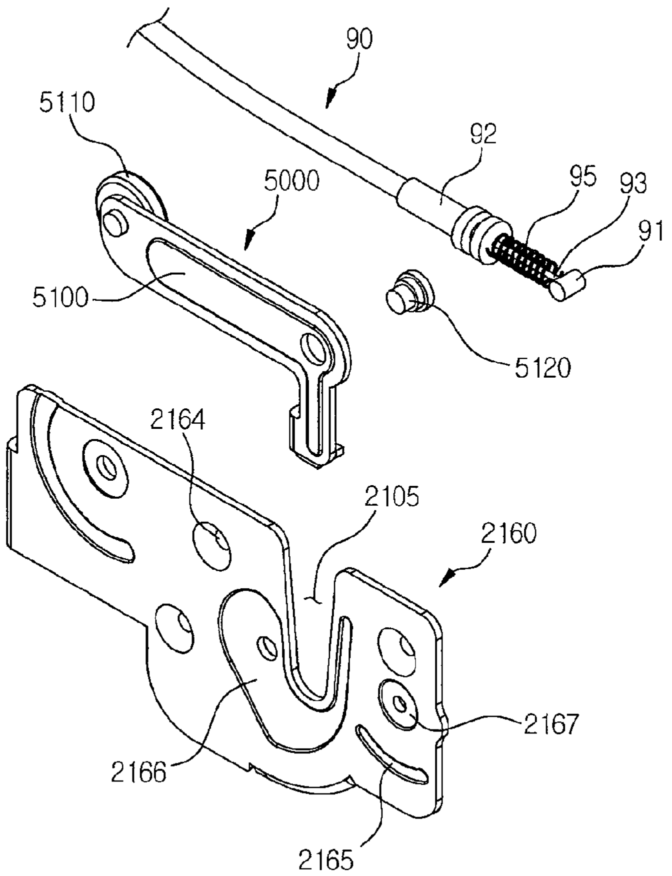

[Fig. 40]
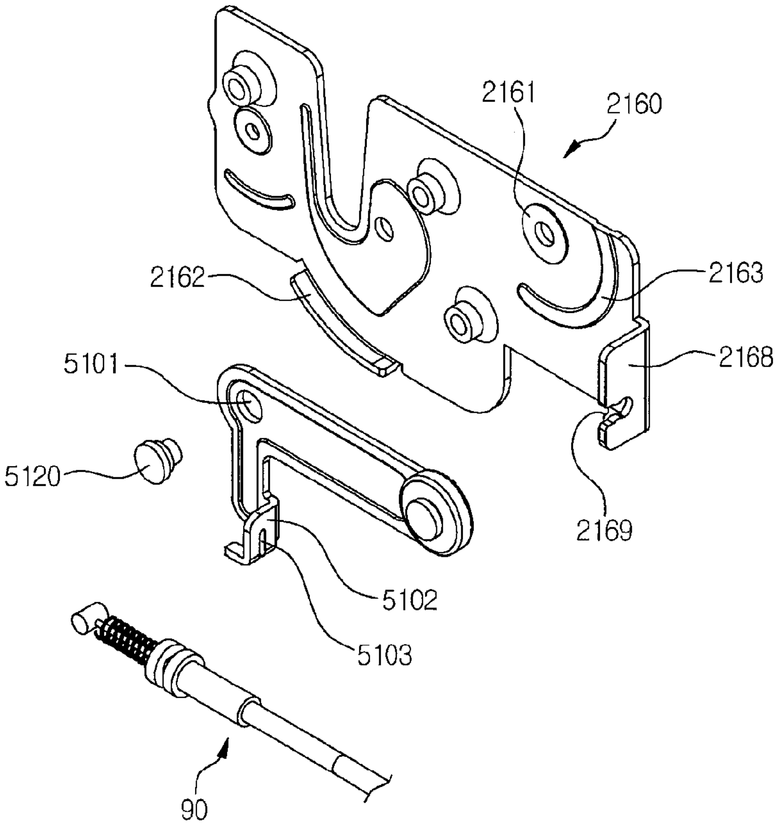
[Fig. 41]
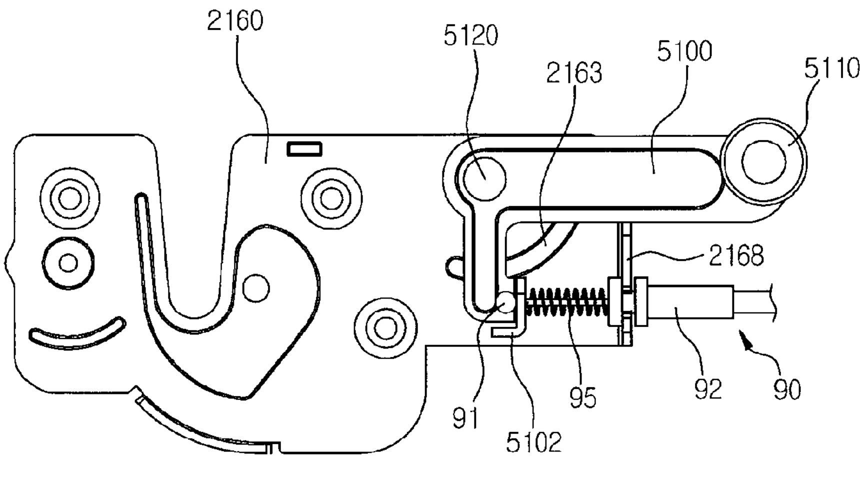

[Fig. 42]
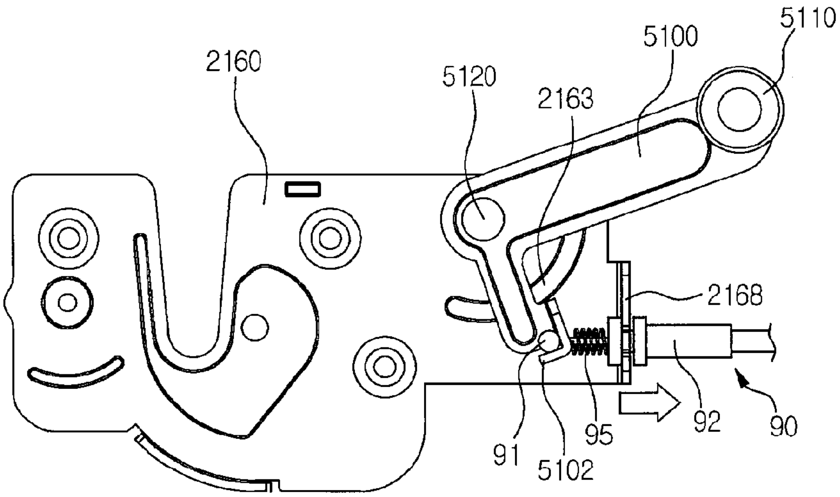

ELECTRIC LATCH FOR VEHICLE DOOR

This application is the national phase entry of international patent application no. PCT/KR2021/004786, filed Apr. 16, 2021 and claims the benefit of Korean patent application No. 10-2020-0048098, filed Apr. 21, 2020, the disclosures of which are incorporated herein by reference in their entirety.

TECHNICAL FIELD

The present disclosure relates to a vehicle door latch, and more particularly to an electric latch (E-latch) for vehicle door capable of selectively using a cinching function of completely closing a vehicle door without a vehicle door outer handle when the vehicle door is incompletely closed, and a pusher function of generating a gap to grab the vehicle door by making a distance between the vehicle door and a vehicle body.

BACKGROUND ART

In Korean Patent No. 10-1995346 titled "Vehicle door latch system', there is disclosed a concept of a cinching device completely closing a vehicle door when the vehicle door is incompletely closed.

In Korean Patent No. 10-2059334 titled "Electric opening and closing integrated apparatus for vehicle door", a cinching function of completely closing a vehicle door is performed using a lever completely rotating a latch into which a striker is inserted, an actuator, and a cinching connector transmitting a driving force of the actuator to the lever.

In Korean Patent Application Publication No. 10-2019-0062494 titled "Motor vehicle lock assembly", there is disclosed a concept of a push-open driving device generating a gap between a vehicle door and a vehicle body by applying a driving force to the vehicle door in an open direction.

As described above, in the related art, the cinching device and the push-open driving device (pusher function) shall be separately installed.

DISCLOSURE OF INVENTION

Technical Problem

An object of the present disclosure is to address the above-described and other needs and/or problems. Another object of the present disclosure is to provide a vehicle door latch capable of selectively performing a cinching function or a pusher function using one actuator.

The technical objects to be achieved by the present disclosure are not limited to those that have been described hereinabove merely by way of example, and other technical objects that are not mentioned can be clearly understood from the following descriptions by those skilled in the art, to which the present disclosure pertains.

Solution to Problem

In one aspect, there is provided an electric latch for vehicle door, comprising an actuator installed in a vehicle door, wherein the vehicle door is installed in a vehicle body, a latch part installed in the vehicle door, wherein the latch part pulls the vehicle door towards an inside of the vehicle body by a driving force of the actuator until the vehicle door is completely closed when the vehicle door is incompletely closed, a pusher part installed in the vehicle door, wherein the pusher part pushes the vehicle door towards an outside of the vehicle body by the driving force of the actuator so as to form a gap between the vehicle door and the vehicle body when the vehicle door opens, an actuator driver installed in the actuator, a pull member performing a sliding motion by the actuator driver, a cinching connector connected to one side of the pull member and the latch part, the cinching connector transmitting the driving force of the actuator to the latch part, and a pusher connector connected to other side of the pull member and the pusher part, the pusher connector transmitting the driving force of the actuator to the pusher part, wherein the pull member selectively transmits the driving force of the actuator to the latch part or the pusher part.

The latch part may include a latch part housing, a latch pivotally installed on the latch part housing and coupled to the vehicle body, a pivoting member locking or unlocking the latch, and a cinching lever rotating the latch in a direction in which the vehicle door is pulled to the inside of the vehicle body. The cinching connector may be connected to the cinching lever, and the cinching lever may rotate when the driving force of the actuator is transmitted to the cinching connector.

The pusher part may include a pusher part housing, a rotation lever pivotally installed on the pusher part housing, a pusher connected to one side of the rotation lever and sliding in a direction in which the vehicle door opens, and a sliding member connected to other side of the rotation lever and sliding in an opposite direction to the direction in which the pusher slides. The pusher connector may be connected to the sliding member, and the sliding member may slide when the driving force of the actuator is transmitted to the pusher connector.

The pusher may include a door open button abutting on the vehicle door and a door open sensor that is able to be pressed by the door open button. When the door open button is pressed by the vehicle body, the door open sensor may be pressed by the door open button and may check an open state of the vehicle door.

The pusher part may include a rotation lever pivotally installed on the latch part housing. The pusher connector may be connected to the rotation lever, and one side of the rotation lever may rotate in another direction, in which the vehicle door opens, when the driving force of the actuator is transmitted to the pusher connector.

The electric latch for vehicle door may further comprise a return spring connected to the pusher connector. The return spring may be elastically deformed when the driving force of the actuator is transmitted to the pusher connector. The return spring, that returns to an initial state when the driving force of the actuator transmitted to the pusher connector is removed, may be installed in the pusher connector. The driving force of the actuator transmitted to the pusher connector may be blocked when a predetermined time has passed since the vehicle door opens.

Advantageous Effects of Invention

An electric latch for vehicle door according to the present disclosure has the following effects and advantages.

The present disclosure can improve the safety using a latch part with a cinching function of pulling a vehicle door to the inside of a vehicle body until the vehicle door is completely closed when the vehicle door is incompletely closed.

The present disclosure can easily open the vehicle door without a vehicle door outer handle due to a push part that pushes the vehicle door to the outside of the vehicle body so as to generate a gap between the vehicle door and the vehicle body to the extent that a user can put his/her hand when the vehicle door is completely closed.

The present disclosure can perform both the cinching function and the pusher function using one actuator driver by connecting a cinching connector connected to a cinching lever to one side of a pull member performing a sliding motion by the actuator driver, installing a pusher connector connected to the push part on other side of the pull member, and selectively pulling the cinching connector or the pusher connector by the sliding motion. Hence, the device can be reduced in volume and can be lightened.

The present disclosure includes a door open button pressed by the vehicle door when the pusher part pushes the vehicle door, and a door open sensor pressed by the door open button, and thus can check an open state of the vehicle door.

Effects that could be achieved by the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF DRAWINGS

The accompanying drawings, which are included to provide a further understanding of the disclosure and are incorporated in and constitute a part of the disclosure, illustrate embodiments of the disclosure and together with the description serve to explain the principle of the disclosure.

FIG. 1 is a front perspective view of an electric latch for vehicle door according to a first embodiment of the present disclosure.

FIG. 2 is a front exploded perspective view of an electric latch for vehicle door according to a first embodiment of the present disclosure.

FIG. 3 is a front perspective view of a first housing in an electric latch for vehicle door according to a first embodiment of the present disclosure.

FIG. 4 is a rear perspective view of a first housing in an electric latch for vehicle door according to a first embodiment of the present disclosure.

FIG. 5 is a front perspective view of a second housing in an electric latch for vehicle door according to a first embodiment of the present disclosure.

FIG. 6 is a rear perspective view of a second housing in an electric latch for vehicle door according to a first embodiment of the present disclosure.

FIG. 7 is a front perspective view of a third housing in an electric latch for vehicle door according to a first embodiment of the present disclosure.

FIG. 8 is a rear perspective view of a third housing in an electric latch for vehicle door according to a first embodiment of the present disclosure.

FIG. 9 is a front exploded perspective view of a latch in an electric latch for vehicle door according to a first embodiment of the present disclosure.

FIG. 10 is a front exploded perspective view of a pivoting member in an electric latch for vehicle door according to a first embodiment of the present disclosure.

FIG. 11 is a front perspective view of a lever in an electric latch for vehicle door according to a first embodiment of the present disclosure.

FIG. 12 is a rear exploded perspective view of a lever in an electric latch for vehicle door according to a first embodiment of the present disclosure.

FIG. 13 is a front perspective view of a reinforcement plate in an electric latch for vehicle door according to a first embodiment of the present disclosure.

FIG. 14 is an assembly diagram of a latch, a pivoting member, a lever, and a reinforcement portion in an electric latch for vehicle door according to a first embodiment of the present disclosure.

FIG. 15 is a front view illustrating a state when a latch part opens in an electric latch for vehicle door according to a first embodiment of the present disclosure.

FIG. 16 is a front view illustrating a state when a latch part is incompletely closed in an electric latch for vehicle door according to a first embodiment of the present disclosure.

FIG. 17 is a rear view illustrating a state when a latch part is incompletely closed in an electric latch for vehicle door according to a first embodiment of the present disclosure.

FIG. 18 is a front view illustrating a state when a latch part is completely closed in an electric latch for vehicle door according to a first embodiment of the present disclosure.

FIG. 19 is a rear view illustrating a state when a latch part is completely closed in an electric latch for vehicle door according to a first embodiment of the present disclosure.

FIG. 20 is a plan perspective view of an actuator in an electric latch for vehicle door according to a first embodiment of the present disclosure.

FIG. 21 is a plan exploded perspective view of an actuator in an electric latch for vehicle door according to a first embodiment of the present disclosure.

FIG. 22 is a bottom perspective view of a first actuator case in an electric latch for vehicle door according to a first embodiment of the present disclosure.

FIG. 23 is a plan perspective view of a second actuator case in an electric latch for vehicle door according to a first embodiment of the present disclosure.

FIG. 24 is a plan exploded perspective view of an actuator driver in an electric latch for vehicle door according to a first embodiment of the present disclosure.

FIG. 25 is a plan view of an actuator of an initial state in an electric latch for vehicle door according to a first embodiment of the present disclosure.

FIG. 26 is a bottom view of an actuator of an initial state in an electric latch for vehicle door according to a first embodiment of the present disclosure.

FIG. 27 is a plan view of an actuator of a cinching state in an electric latch for vehicle door according to a first embodiment of the present disclosure.

FIG. 28 is a bottom view of an actuator of a cinching state in an electric latch for vehicle door according to a first embodiment of the present disclosure.

FIG. 29 is a plan view of an actuator of a push state in an electric latch for vehicle door according to a first embodiment of the present disclosure.

FIG. 30 is a bottom view of an actuator of a push state in an electric latch for vehicle door according to a first embodiment of the present disclosure.

FIG. 31 is a front perspective view of a pusher part in an electric latch for vehicle door according to a first embodiment of the present disclosure.

FIG. 32 is a front exploded perspective view of a pusher part in an electric latch for vehicle door according to a first embodiment of the present disclosure.

FIG. 33 is a rear exploded perspective view of a pusher part in an electric latch for vehicle door according to a first embodiment of the present disclosure.

FIG. 34 is a rear view of a pusher part of an initial state in an electric latch for vehicle door according to a first embodiment of the present disclosure.

FIG. 35 is a front view of a pusher part of an initial state in an electric latch for vehicle door according to a first embodiment of the present disclosure.

FIG. 36 is a rear view of a pusher part of a push state in an electric latch for vehicle door according to a first embodiment of the present disclosure.

FIG. 37 is a front view of a pusher part of a push state in an electric latch for vehicle door according to a first embodiment of the present disclosure.

FIG. 38 is a front perspective view of an electric latch for vehicle door according to a second embodiment of the present disclosure.

FIG. 39 is a front exploded perspective view of a second housing and a pusher part in an electric latch for vehicle door according to a second embodiment of the present disclosure.

FIG. 40 is a rear exploded perspective view of a second housing and a pusher part in an electric latch for vehicle door according to a second embodiment of the present disclosure.

FIG. 41 is a rear view of a second housing and a pusher part in an initial state in an electric latch for vehicle door according to a second embodiment of the present disclosure.

FIG. 42 is a rear view of a second housing and a pusher part in a push state in an electric latch for vehicle door according to a second embodiment of the present disclosure.

MODE FOR THE INVENTION

Reference will now be made in detail to embodiments of the disclosure, examples of which are illustrated in the accompanying drawings. This disclosure may, however, be embodied in many different forms and should not be construed as limited to the embodiments set forth herein.

It will be noted that a detailed description of known arts will be omitted if it is determined that the detailed description of the known arts can obscure embodiments of the disclosure. In the drawings, illustration of parts unrelated to embodiments of the present disclosure is omitted for clarity and simplicity of description. The same reference numerals designate the same or very similar elements throughout the present disclosure. In the drawings, thickness, width, etc. of elements are exaggerated or reduced for clarity of description, and should not be construed as limited to those illustrated in the drawings.

In addition, it will be understood that, when an element such as a layer, film, region, or plate is referred to as being "on" another element, it may be directly disposed on another element or may be disposed such that an intervening element is also between them. Accordingly, when an element such as a layer, film, region, or plate is disposed "directly on" another element, this means that there is no intervening element between the elements.

Use of terminology herein is merely intended to facilitate description of the present disclosure, and the terminology itself is not intended to limit the present disclosure. The terms including an ordinal number such as first, second, etc. may be used to describe various components, but the components are not limited by such terms. The terms are used only for the purpose of distinguishing one component from other components. A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

Terms for relative position such as "below" and "on" can be used to more easily describe a position relationship between one component and other components illustrated in the drawings. These terms are intended to include other meanings or operations of a device in use together with the meanings intended in the drawings. For example, if the device illustrated on the drawings is turned over, any part that is described to be "under" other parts is described to be "on" the other parts. Thus, an example term "under" includes both the up and down directions. The device can rotate 90 degrees or rotate at other angles, and terms describing the position relationship can be interpreted accordingly.

Hereinafter, embodiments of a vehicle door latch are described.

In embodiments of the present disclosure, a front-rear direction means a front-rear direction (longitudinal direction) of a vehicle, an up-down direction means a left-right direction (width direction) of a vehicle, and a left-right direction means an up-down direction of a vehicle.

More specifically, in embodiments of the present disclosure, the left side means a lower part of a vehicle, and the right side means an upper part of a vehicle.

First Embodiment

As illustrated in FIGS. 1 and 2, an electric latch (E-latch) for vehicle door according to a first embodiment of the present disclosure may include an actuator 3000 connected to a latch part 2000 locking or unlocking a vehicle door, and a pusher part 4000 that is connected to the actuator 3000 and generates a space to grab the vehicle door by making a distance between the vehicle door and a vehicle body.

The latch part 2000 may include a door opening member opening the vehicle door and a driver actuating the door opening member.

The driver may include a motor 2610.

The door opening member may include a latch 2200 pivotally installed on the latch part 2000, a pivoting member 2370 locking or unlocking the latch 2200, an open lever 2350 rotating the pivoting member 2370, and an open plate 2300 rotating the open lever 2350.

The open plate 2300 may be slid by a door lever connector 40 that can operate inside the vehicle door, a door key connector 50 that is linked to the rotation of a key cylinder of the vehicle door, or a door outside connector 60 that is linked to the pull of a handle portion of the vehicle door provided as a hidden handle.

The open plate 2300 may also be directly slid by a door latch key 2630.

The latch part 2000 may include a safety plate 2400 and a locking member 2615 that can mechanically or electrically prevent malfunction of the latch part 2000.

The locking member 2615 may be actuated by the motor 2610 and may move between a position at which the rotation of the open lever 2350 is prevented and a position at which the open lever 2350 rotates.

The safety plate 2400 may move between a position at which the actuation of the locking member 2615 is prevented and a position at which the locking member 2615 is actuated, by a door latch connector 30 that is linked to the pull-in and pull-out of the handle portion of the vehicle door provided as the hidden handle.

The open plate 2300 and the safety plate 2400 may be installed in an insert plate 2700 and a connector cover 2800 and may move along the insert plate 2700 and the connector cover 2800. In this instance, the outsides of the door latch connector 30, the door lever connector 40, the door key connector 50, and the door outside connector 60 may be fixed to the connector cover 2800, and only cables inside the connectors 30, 40, 50 and 60 may be slid along the open plate 2300 and the safety plate 2400.

With reference to FIG. 2, configuration of the latch part 2000 is described in detail below.

Housing

As illustrated in FIG. 2, a latch part housing may include a first housing 2110, a second housing 2130 disposed in front of the first housing 2110, and a third housing 2150 disposed behind the first housing 2110.

The first housing 2110 is illustrated in detail in FIGS. 3 and 4.

A sealing member 2140 may be disposed between a rear perimeter of the first housing 2110 and a front perimeter (edge) of the third housing 2150 to prevent the driver from being damaged by water.

As illustrated in FIG. 1, striker insertion grooves 2105 into which a striker 2001 connected to the vehicle body is inserted may be formed in an upper part and in front of the housing. The striker insertion groove 2105 may be formed such that that the upper part and the front are opened and the rear is closed.

Thus, the striker insertion groove 2105 formed in the first housing 2110 may be formed in a groove shape, and the striker insertion groove 2105 formed in the second housing 2130 may be formed in a hole shape in which it is penetrated in the front-rear direction.

The striker 2001 is illustrated in detail in FIGS. 15, 16 and 18.

As illustrated in FIG. 3, the first housing 2110 may be formed in a plate shape.

At a front surface of the first housing 2110, a latch installation groove 2111 in which the latch 2200 to be described below is installed and a pivoting member installation groove 2116 in which the pivoting member 2370 is installed may be formed.

The first housing 2110 may be formed of a plastic material and injection-molded. This can facilitate the manufacture of the device.

The latch installation groove 2111 may be formed such that the front is opened and the rear is closed, and thus can facilitate the assembly of components. The front of the latch installation groove 2111 may be covered by the second housing 2130 during the assembly.

The upper part of the latch installation groove 2111 may communicate with the striker insertion groove 2105.

Further, a spring insertion groove 2113 may be formed at the front of the first housing 2110.

The spring insertion groove 2113 may be disposed in the rear of the latch installation groove 2111 and may communicate with the latch installation groove 2111. The spring insertion groove 2113 may be formed in a fan shape, and a first return spring 2250 to be described below may be inserted into the spring insertion groove 2113. Hence, other end 2253 of the first return spring 2250 may rotate together with the latch 2200.

A latch boss 2114 may be formed in the spring insertion groove 2113 to protrude forward, and a latch pivot shaft 2230 to be described below may be installed on the latch boss 2114.

A sensor transfer member insertion portion 2129, into which a third sensor transfer member 2911 and a fourth sensor transfer member 2912 are inserted, may be formed in the first housing 2110, so as to communicate with the latch installation groove 2111. The sensor transfer member insertion portion 2129 may be disposed in a lower part of the striker insertion groove 2105. The sensor transfer member insertion portion 2129 may be open rearward, and may include a groove which is penetrated in the front-rear direction.

The third sensor transfer member 2911 and the fourth sensor transfer member 2912 may be pressed by the rotation of the latch 2200 and may transmit a signal to a controller.

On the left side of the first housing 2110, a catching portion guide groove 2115 may be formed to be penetrated in the front-rear direction so as to communicate with the spring insertion groove 2113 and the latch installation groove 2111.

The catching portion guide groove 2115 may be formed in an arc shape around circumferences of the spring insertion groove 2113 and the latch installation groove 2111.

The pivoting member installation groove 2116 may be disposed on the right side of the latch installation groove 2111. The pivoting member installation groove 2116 may be formed such that the front is opened and the rear is closed, and thus can facilitate the assembly of components. The front of the pivoting member installation groove 2116 may be covered by the second housing 2130 during the assembly.

The left side of the pivoting member installation groove 2116 may communicate with the right side of the latch installation groove 2111.

Furthermore, a spring insertion groove 2117 may be formed at the front of the first housing 2110.

The spring insertion groove 2117 may be disposed in the rear of the pivoting member installation groove 2116 and may communicate with the pivoting member installation groove 2116.

An upper part of the spring insertion groove 2117 may be formed in an egg shape, and a lower part of the spring insertion groove 2117 may be formed to protrude to the left side and the lower part.

A pivoting member spring 2390 to be described below may be inserted into the spring insertion groove 2117, and thus a second bent portion 2393 of the pivoting member spring 2390 may rotate together with the pivoting member 2370.

A pivoting boss 2119 may be formed in the spring insertion groove 2117 to protrude forward, and a pivot shaft 2380 to be described below may be installed on the pivoting boss 2119.

A pivoting member catching portion through hole 2118 may be formed on the right side of the first housing 2110. The pivoting member catching portion through hole 2118 may be formed in an elongated arc shape in the left-right direction and may be penetrated in the front-rear direction.

The pivoting member catching portion through hole 2118 may be disposed in a lower part of the spring insertion groove 2117 and may communicate with the pivoting member installation groove 2116.

Bumper member insertion grooves 2123 into which a bumper member 2360 is inserted may be formed in the middle and on the upper part of the first housing 2110, so as to communicate with the striker insertion groove 2105 or the latch installation groove 2111.

The bumper member insertion groove 2123 in the middle of the first housing 2110 may be open forward and upward, and an upper part of the bumper member insertion groove 2123 may communicate with the striker insertion groove 2105.

The bumper member insertion groove 2123 on the upper part of the first housing 2110 may be open forward, and a right side portion of the bumper member insertion groove 2123 may communicate with the latch installation groove 2111.

The bumper member 2360 in the middle of the first housing 2110 can prevent an impact or a noise due to contact with the first housing 2110 when the striker 2001 is inserted into the striker insertion groove 2105.

The bumper member 2360 on the upper part of the first housing 2110 can prevent the impact or noise due to contact with the first housing 2110 when the latch 2200 rotates and reaches an open state.

A second housing fitting groove 2109*b* into which the lower part of the second housing 2130 is fitted may be formed under the middle of the first housing 2110 to be recessed rearward.

The second housing 2130 may be installed on the first housing 2110 by the second housing fitting groove 2109*b*, so that the second housing 2130 does not flow in the up-down direction and the left-right direction.

An edge of the first housing 2110 may be formed to protrude rearward, and a space may be also formed at the rear of the first housing 2110.

A door latch connector fitting portion 2128 in which the door latch connector 30 is installed may be formed at a left edge of the first housing 2110 to protrude rearward.

A door latch key installation groove 2101 in which the door latch key 2630 is installed may be formed at a lower right edge of the first housing 2110 to be penetrated in the up-down direction.

The door latch key 2630 can be operated outside the latch part 2000 through the door latch key installation groove 2101.

A motor installation portion 2112 in which the motor 2610 is installed may be formed on an upper right side of the rear surface of the first housing 2110. Grooves may be formed in the middle and on the right side of the motor installation portion 2112 so that a shaft of the motor 2610 can be fitted to them.

A motor shaft fitting portion 2112*a* may be formed on the left side of the motor installation portion 2112 so that an end of the shaft of the motor 2610 can be fitted to it.

A first guide portion 2125 may be formed on the right side of the rear surface of the first housing 2110 to protrude rearward. The first guide portion 2125 may be disposed on an upper part of the motor installation portion 2112. A lower surface of the first guide portion 2125 may abut on an upper surface of the safety plate 2400 and may guide the left-right direction sliding of the safety plate 2400.

A shaft 2106, a first open lever guide portion 2107, and a second open lever guide portion 2108 may be formed on the right side of the rear surface of the first housing 2110 to protrude rearward.

The shaft 2106 may be disposed on the lower left side of the motor installation portion 2112.

The open lever 2350 to be described below may be fitted to the shaft 2106.

The first open lever guide portion 2107 may be disposed on the lower left side of the shaft 2106, and the second open lever guide portion 2108 may be disposed on the lower right side of the shaft 2106.

The first and second open lever guide portions 2107 and 2108 may be disposed within a radius of rotation of the open lever 2350 so that the open lever 2350 can rotate within a predetermined range when rotating about the shaft 2106.

A connector cover installation portion 2126 in which the connector cover 2800 is installed may be formed on the upper left side of the rear surface of the first housing 2110.

A plurality of protrusions may be formed on the connector cover installation portion 2126, so that the connector cover 2800 can be easily inserted. The right side of the connector cover installation portion 2126 may be blocked by the left side of a second guide portion 2127 to be described below, and the left side of the connector cover installation portion 2126 may protrude rearward. Hence, the connector cover installation portion 2126 can prevent the connector cover 2800 from flowing in the left-right direction.

A cinching connector installation portion 2120 in which a cinching connector 80 to be described below is installed may be protrudingly formed on the lower left side of the rear surface of the first housing 2110. A groove in which a catching protrusion fixing portion 82 of the cinching connector 80 is fitted and fixed may be formed in the rear of the cinching connector installation portion 2120.

A second guide portion 2127 may be protrudingly formed at the center of the rear surface of the first housing 2110. The second guide portion 2127 may be disposed on the right side of the connector cover installation portion 2126. The second guide portion 2127 may be formed correspondingly to the shape of the striker insertion groove 2105. The second guide portion 2127 may be disposed on the left side of the motor shaft fitting portion 2112*a*.

An emergency lever installation groove 2103 which is penetrated in the front-rear direction may be formed on the second guide portion 2127. The emergency level installation groove 2103 may communicate with the striker insertion groove 2105.

A third housing fitting portion 2104 that can be coupled to the third housing 2150 may be protrudingly formed on the left and right surfaces and the lower surface of the first housing 2110.

A first fastening portion 2121 formed in the first housing 2110 may be formed in a shape of boss and protrude rearward. A bolt may be fastened to a hole formed in the first fastening portion 2121, and the front of the bolt may be blocked. An rear end of first fastening portion 2121 may be formed to protrude further to the rear than the edge of the first housing 2110. Threads may be formed on an inner circumferential surface of the first fastening portion 2121 during the bolt assembly. The first fastening portions 2121 may be respectively disposed on the upper left and right sides and the lower left and right sides of the first housing 2110.

A guide boss 2122 may be formed on the upper right side of the first housing 2110 to protrude rearward. The guide boss 2122 may be disposed between the first guide portion 2125 and the second guide portion 2127.

The second housing 2130 is illustrated in detail in FIGS. 5 and 6.

The second housing 2130 may be formed in a plate shape.

A shaft insertion hole into which a latch pivoting shaft 2230 included as a rivet is inserted may be formed in the second housing 2130 to be penetrated in the front-rear direction.

In the second housing 2130, a first protrusion 2135, a second protrusion 2136, and a third protrusion 2137 may be formed around the shaft insertion hole and recessed from the front to the rear. The first protrusion 2135, the second protrusion 2136, and the third protrusion 2137 may protrude rearward rather than the bottom of the rear surface of the second housing 2130.

The first protrusion 2135 may contact a front surface of the pivoting member 2370 to be described below. Therefore, during the assembly, the first protrusion 2135 can minimize a friction between the pivoting member 2370 and the second housing 2130 while the pivoting member 2370 does not move in the front-rear direction. The first protrusion 2135 may be formed in an arc shape. The first protrusion 2135 may bend along a rotation direction of the pivoting member 2370.

The second protrusion 2136 may be formed around the shaft insertion hole and the striker insertion groove 2105 and may contact the front surface of the latch 2200. Therefore, during the assembly, the second protrusion 2136 can minimize a friction between the latch 2200 and the second housing 2130 while the pivoting member 2370 does not move in the front-rear direction.

The third protrusion 2137 may be formed in a circular shape and disposed on the right side of the second protrusion 2136. A rivet insertion hole into which the pivot shaft 2380 is inserted may be formed in the third protrusion 2137 so as to be penetrated in the front-rear direction.

A fourth protrusion 2132 that is installed in the second housing fitting groove 2109*b* of the first housing 2110 may be formed in an arc shape at the lower part of the second housing 2130 to protrude rearward.

A plurality of door installation portions 2124 and 2134 may be formed at the front surface of the first housing 2110 and the second housing 2130 so that the latch part 2000 can be bolted and fastened to the vehicle door. The door installation portions 2124 and 2134 may be respectively disposed at the upper and lower left sides of the first housing 2110, at the upper and lower parts of the center of the second housing 2130, and at the right side of the striker insertion groove 2105. The door installation portion 2124 formed at the first housing 2110 may be formed in a shape of a groove which is recessed to the rear, and the door installation portion 2134 formed at the second housing 2130 may be formed in a shape of a hole penetrated in the front-rear direction.

Further, an installation boss 2134*a* may be formed at the rear surface of the second housing 2130 to protrude rearward. The installation boss 2134*a* may be inserted into the door installation portion 2124 of the first housing 2110. The installation boss 2134*a* may be formed to surround the door installation portion 2134 formed at the second housing 2130. A thread may be formed on an inner wall of the installation boss 2134*a*.

Hence, the latch part 2000 can be easily and firmly installed in the vehicle door.

A cut portion corresponding to the striker insertion groove 2105 may be formed in the second housing 2130 so that the front of the striker insertion groove 2105 is opened.

A pusher installation groove 2131 that is penetrated in the front-rear direction may be formed on the left side of the second housing 2130.

A plurality of pusher coupling portions 2138 and 2139 may be formed on an upper part and a lower part of the pusher installation groove 2131 so that the pusher part 4000 can be bolted and fastened to the second housing 2130.

The third housing 2150 is illustrated in detail in FIGS. 7 and 8.

The third housing 2150 may be formed in a plate shape whose edge protrudes to the front so that a space is formed at a front surface. The space of the third housing 2150 may be opened forward.

The third housing 2150 may cover the rear surface of the first housing 2110 which is the opposite surface of the surface on which the latch 2200 is installed. That is, the second housing 2130 may be coupled to the front surface of the first housing 2110, and the third housing 2150 may be coupled to the rear surface of the first housing 2110.

The third housing 2150 may be bolted and fastened to the rear surface of the first housing 2110.

First and second fastening portions 2121 and 2155 for bolting and fastening may be respectively formed at the rear surface of the first housing 2110 and the third housing 2150.

The second fastening portion 2155 formed at the third housing 2150 may be formed in a shape of a through hole that is penetrated in the front-rear direction. The second fastening portion 2155 may be disposed to correspond to the first fastening portion 2121 and may be assembled with the first fastening portion 2121.

A fifth protrusion 2153*a* may be formed in the center of the third housing 2150 to protrude forward.

The fifth protrusion 2153*a* may be formed to bend along a rotation direction of a cinching lever 2530. A latch pivoting shaft insertion groove 2152 may be formed at the center of rotation of the fifth protrusion 2153*a* and may be recessed from the front to the rear.

The rear of the latch pivot shaft 2230 may be inserted into the latch pivoting shaft insertion groove 2152.

A lever guide portion 2153*b* may be disposed at the left and right under the fifth protrusion 2153*a*. The lever guide portion 2153*h* may be recessed from the front to the rear.

A connector installation portion 2153*c* may be installed on the left side of the lever guide portion 2153*b*.

A catching member fitting portion 2531 of the cinching lever 2530 and the lower part of the open plate 2300 may be inserted into the lever guide portion 2153*b*, and the catching protrusion fixing portion 82 of the cinching connector 80 may be installed in the connector installation portion 2153*c*.

A connector cover installation groove 2156 may be formed at the upper part of the third housing 2150. The connector cover installation groove 2156 may be open forward.

Connector cover support portions 2157 may be protrudingly formed at upper and lower parts of the connector cover installation groove 2156. Due to the connector cover support portion 2157, when installing or actuating the connector cover 2800 in the connector cover installation groove 2156, friction can be minimized and thus performance of the product can be improved.

The connector cover support portion 2157 formed at the lower part may fix the connector cover 2800, prevent the open plate 2300 and the safety plate 2400 from deviating, and guide left-right direction sliding to the open plate 2300 and the safety plate 2400. Since the rear of the connector cover installation groove 2156 is blocked, the connector cover 2800 can be prevented from moving to the rear.

A first housing insertion groove 2158 into which the shaft 2106 of the first housing 2110 is inserted may be formed in the center of the third housing 2150 to be recessed rearward.

Connector through grooves 2159*a* and 2159*b* that are opened forward and in the left-right direction may be formed at the upper and lower left sides of the third housing 2150.

The door lever connector 40, the door key connector 50, and the door outside connector 60 may be installed in the connector through groove 2159*a* formed at the upper part.

The connector through groove 2159a at the upper part may communicate with the connector cover installation groove 2156.

The cinching connector 80 may be installed in the connector through groove 2159b formed at the lower part. The connector through groove 2159b at the lower part may communicate with the lever guide portion 2153b.

A wire connector 2154a may be formed at the upper part of the rear of the third housing 2150 to protrude rearward. The wire connector 2154a may be formed in a rectangular shape with rounded edges which is hollow as a whole. A wire through groove 2154b that is penetrated in the front-rear direction may be formed in the center of the wire connector 2154a. The wire may be connected to the inside of the third housing 2150 from the outside through the wire through groove 2154b.

A first housing fitting portion 2151a that can be fitted to the third housing fitting portion 2104 of the first housing 2110 may be formed at the left and right surfaces and the lower surface of the third housing 2150. The first housing fitting portion 2151a may be formed in a ring shape. Thus, the first housing fitting portion 2151a and the third housing fitting portion 2104 may be fitted and coupled to each other. The first housing 2110 and the third housing 2150 can be easily fastened to each other without bolting.

Hence, the first housing 2110 and the third housing 2150 can be more firmly assembled.

A rib may be formed in a lattice shape at the rear surface of the third housing 2150. Hence, rigidity and durability of the third housing 2150 can be improved.

Latch

The latch 2200 is illustrated in detail in FIG. 9.

The latch 2200 may be installed in the first housing 2110 and disposed inside the latch installation groove 2111.

The latch 2200 may be pivotally installed in the first housing 2110 through the latch pivot shaft 2230 installed in the first housing 2110, the second housing 2130, and the third housing 2150.

The latch 2200 may be formed in a plate shape.

A latch groove 2209 into which the latch pivot shaft 2230 is inserted may be formed in the center of the latch 2200 to be penetrated in the front-rear direction.

A locking groove 2201 may be formed on an outer circumferential surface of the latch 2200.

The locking groove 2201 may be penetrated in the front-rear direction, and the upper right side of the locking groove 2201 may be opened.

A second locking catching portion 2201a in which a locking portion 2371 of the pivoting member 2370 is caught may be formed on the right side of the locking groove 2201.

A striker catching protrusion 2204 in which the striker 2001 is caught may be formed at the latch 2200.

A right surface of the striker catching protrusion 2204 may be formed to bend such that the center protrudes to the right. The locking groove 2201 may be positioned under the center.

Hence, the striker 2001 can be smoothly inserted into the locking groove 2201 along a slope of the striker catching protrusion 2204. When the striker 2001 is inserted into the locking groove 2201, it may be difficult for the striker 2001 to come out of the front due to the protrusion of the striker catching protrusion 2204.

An auxiliary locking groove 2202 may be formed at the right side of the locking groove 2201 in the latch 2200.

The auxiliary locking groove 2202 may be formed between a first locking catching portion 2202a and a second locking catching portion 2201a in which the locking portion 2371 is caught.

The auxiliary locking groove 2202 may be formed in a shape similar to the locking groove 2201 while having a narrower depth than the locking groove 2201. That is, a distance between the auxiliary locking groove 2202 and the center of rotation of the latch 2200 may be larger than a distance between the locking groove 2201 and the center of rotation of the latch 2200.

The locking groove 2201 and the auxiliary locking groove 2202 may be spaced from each other along a circumferential direction.

When closing the vehicle door, the locking portion 2371 of the pivoting member 2370 may be first inserted into the auxiliary locking groove 2202 and then inserted into the locking groove 2201.

A spring fitting portion 2207 may be formed at the lower outer circumferential surface of the latch 2200.

The spring fitting portion 2207 may be formed in a protrusion shape, and the other end 2253 of the first return spring 2250 may be caught in the spring fitting portion 2207 and mat rotate together with the latch 2200.

A protrusion 2208 may be formed on the left outer circumferential surface of the latch 2200 to protrude outward.

The protrusion 2208 may be disposed in front of the catching portion guide groove 2115.

A latch catching portion 2532 of the cinching lever 2530 to be described below may be fitted to a lower part of the protrusion 2208, and the latch 200 may rotate by the latch catching portion 2532.

The locking groove 2201, the auxiliary locking groove 2202, the spring fitting portion 2207, and the protrusion 2208 may be sequentially disposed along a direction (clockwise) in which the latch 2200 rotates when the vehicle door is closed.

The latch 2200 may be surrounded by an elastic cover 2210.

The elastic cover 2210 may cover an outer surface of the latch 2200 through insert injection. The elastic cover 2210 may be formed of a material with elasticity such as rubber and can absorb an impact applied to the latch 2200 and prevent a noise.

The elastic cover 2210 may surround the remaining portion of the latch 2200 except for a part of the first locking catching portion 2202a, a part of the second locking catching portion 2201a, and a portion contacting the first return spring 2250.

An elastic cover groove 2211 into which the latch pivot shaft 2230 is inserted may be formed in the center of the elastic cover 2210 to be penetrated in the front-rear direction.

A plurality of auxiliary grooves that is recessed in a radial direction may be formed around the elastic cover groove 2211.

Hence, a friction force generated between the elastic cover 2210 and the latch pivot shaft 2230 when the elastic cover 2210 is pivoted can be reduced. In addition, since a lubricant (grease) can be accommodated in the auxiliary grooves of the elastic cover groove 2211 for a long time, the performance can be improved.

Slits 2212 may be formed in the elastic cover 2210. The slits 2212 may be respectively formed in a portion abutting on the bumper member 2360 disposed on the upper part of the first housing 2110 and in a portion abutting on the striker 2001. The slits 2212 can reduce an impact generated when the latch 2200 abuts on other members.

The first return spring 2250 may be provided so that the latch 200 is automatically returned upon the unlocking.

One end 2252 and other end 2253 of the first return spring 2250 may be formed to correspond to an assembly shape. The one end 2252 may be extended to the left side, and the other end 2253 may be bent forward at a right angle.

The one end 2252 of the first return spring 2250 may be caught in an upper part of the spring insertion groove 2113 of the first housing 2110, a coil portion may be inserted into the latch boss 2114 and the latch pivot shaft 2230, and the other end 2253 may be caught in the left side of the spring fitting portion 2207 of the latch 2200.

The assembly can be further improved by the one end 2252 and the other end 2253 of the first return spring 2250.

When the latch 2200 rotates, the other end 2253 of the first return spring 2250 may rotate together with the latch 2200.

A catching plate 2231 may be formed in the middle of the latch pivot shaft 2230 inserted into the latch 2200 and the first return spring 2250.

The latch 2200 may be inserted into the front of the catching plate 2231, and the first return spring 2250 may be inserted into the rear of the catching plate 2231. Hence, when the latch 2200 rotates, friction between the front surface of the first return spring 2250 and the rear surface of the latch 2200 can be prevented.

The first housing 2110 and the cinching lever 2530 may be inserted into the rear of the first return spring 2250.

Diameters of a front end and a rear end of the latch pivot shaft 2230 may be less than diameters of other ends of the latch pivot shaft 2230. The front end of the latch pivot shaft 2230 may be assembled to the second housing 2130, and the rear end of the latch pivot shaft 2230 may be assembled to a reinforcement plate 2340 to be described below.

That is, the second housing 2130, the latch 2200, the first return spring 2250, the first housing 2110, the cinching lever 2530, and the reinforcement plate 2340 may be installed on the latch pivot shaft 2230 in the order named from the front of the latch pivot shaft 2230.

<Pivoting Member>

The pivoting member 2370 is illustrated in detail in FIG. 10. The pivoting member 2370 may be referred to as a pawl.

The pivoting member 2370 may be linked to the open lever 2350.

The pivoting member 2370 may be disposed in front of the first housing 2110 and may be pivotally installed in the second housing 2130 by the pivot shaft 2380 disposed in the front-rear direction.

The pivoting member 2370 may include the locking portion 2371 and a catching protrusion 2373.

The locking portion 2371 may be formed to protrude to the left side of the pivoting member 2370.

The locking portion 2371 may serve to restrict (lock) a position of the latch 2200 and maintain a closed state of the vehicle door.

A latch insertion groove 2372, into which the second locking catching portion 2201*a* and the first locking catching portion 2202*a* of the latch 2200 are inserted when the vehicle door is closed, may be formed on a lower part of the locking portion 2371. The latch insertion groove 2372 may be opened downward and disposed between the locking portion 2371 and the catching protrusion 2373. Due to the latch insertion groove 2372, a state in which the latch 2200 is locked to the pivoting member 2370 when the vehicle door is closed can be stably maintained.

The catching protrusion 2373 may be formed on the right side of the lower surface of the locking portion 2371 to protrude downward.

A pivoting member catching portion 2351 of the open lever 2350 may be inserted into the left side of the catching protrusion 2373. That is, the catching protrusion 2373 may serve to pivot the pivoting member 2370 according to the rotation of the open lever 2350.

The pivoting member 2370 may rotate by being linked to the rotation and movement of the open lever 2350.

As in the latch 2200 described above, the pivoting member 2370 may also be provided with an elastic cover 2375. The elastic cover 2375 may be formed of a material with elasticity such as rubber and can absorb an impact applied to the pivoting member 2370 and prevent a noise. The elastic cover 2375 may be formed to surround the remaining portion excluding the locking portion 2371 from the pivoting member 2370.

A groove into which the pivot shaft 2380 is inserted may be formed on an upper part of the elastic cover 2375 of the pivoting member 2370 to be penetrated in the front-rear direction, and an auxiliary groove may be formed in the groove to be recessed in a radial direction. Hence, a friction force generated between the elastic cover 2375 and the pivot shaft 2380 when the elastic cover 2375 is pivoted can be reduced. In addition, since a lubricant (grease) can be accommodated in the auxiliary groove for a long time, the performance can be improved.

A cover protrusion 2376 inserted into the spring insertion groove 2117 of the first housing 2110 may be formed in the rear of the elastic cover 2375.

Due to the cover protrusion 2376, the elastic cover 2375 and the pivoting member 2370 may not move to the left side more than the spring insertion groove 2117, The pivot shaft 2380 may be installed to pass through upper parts of the pivoting member 2370 and the elastic cover 2375.

A catching plate 2381 may be formed in the middle of the pivot shaft.

The pivoting member 2370 may be inserted into the front of the catching plate 2381, and the pivoting member spring 2390 may be inserted into the rear of the catching plate 2381. Hence, when the pivoting member 2370 rotates, friction between the front surface of the pivoting member spring 2390 and the rear surface of the pivoting member 2370 can be prevented.

The first housing 2110 may be inserted into the rear of the pivoting member spring 2390.

A diameter of a front end of the pivot shaft 2380 may be less than diameters of other ends of the pivot shaft 2380. The front end of the pivot shaft 2380 may be assembled to the second housing 2130, and the rear end of the pivot shaft 2380 may be assembled to the reinforcement plate 2340.

That is, the second housing 2130, the pivoting member 2370, the pivoting member spring 2390, the first housing 2110, and the reinforcement plate 2340 may be installed on the pivot shaft 2380 in the order named from the front of the pivot shaft 2380.

The pivoting member 2370 can pivot clockwise or counterclockwise about the pivot shaft 2380.

The pivoting member spring 2390 for returning the pivoting member 2370 may be provided.

In the same manner as the first return spring 2250, the pivoting member spring 2390 may be provided as a coil spring and may include first and second bent portions 2392 and 2393 which are bent corresponding to the assembly shape at both ends of the pivoting member spring 2390. The first and second bent portions 2392 and 2393 may be bent forward at a right angle.

The first bent portion 2392 of the pivoting member spring 2390 may be caught in the upper part of the spring insertion groove 2117 of the first housing 2110, and the second bent portion 2393 may be caught in and connected to a spring fitting portion 2374 formed at the right side of the pivoting member 2370. A coil portion of the pivoting member spring 2390 may be fitted to the pivoting boss 2119 and the pivot shaft 2380.

The spring fitting portion 2374 may be formed in a shape of a groove or a hole. In this embodiment, the spring fitting portion 2374 may be formed in a groove shape.

When the pivoting member spring 2390 applies a force to the pivoting member 2370 and pushes and then releases the pivoting member 2370 counterclockwise, the pivoting member spring 2390 may return the pivoting member 2370 to its original position by giving an elastic force to the pivoting member 2370 and pivoting the pivoting member 2370 clockwise.

<Open Lever>

The open lever 2350 is illustrated in detail in FIG. 10.

The open lever 2350 may be rotatably installed on the shaft 2106 formed on the rear surface of the first housing 2110. That is, the open lever 2350 may be installed on the opposite surface of the surface of the first housing 2110 on which the latch 2200 is installed.

The open lever 2350 may be formed in a plate shape.

The open lever 2350 may include a lower part that is bent forward and is formed in a stair shape, and an upper part that is bent rearward and is formed in a stair shape, with respect to the portion where a hole into which the shaft 2106 is fitted is formed.

The pivoting member catching portion 2351 abutting on the left side of the catching protrusion 2373 of the pivoting member 2370 may be formed on a front surface of the open lever 2350 to protrude forward. The pivoting member catching portion 2351 may be exposed to the front of the first housing 2110 through the pivoting member catching portion through hole 2118 of the first housing 2110.

A reinforcement portion 2352 may be formed on the upper part of the open lever 2350 to connect a stair-shaped horizontal portion and a stair-shaped vertical portion. Hence, rigidity of the upper part of the open lever 2350 can be improved.

An open catching portion 2353 caught in the locking member 2615 may be formed on the upper part of the open lever 2350. Hence, when the locking member 2615 rotates, the open lever 2350 may also rotate accordingly.

An open catching protrusion 2354 inserted into the open plate 2300 may be formed on a rear surface of the open catching portion 2353 to protrude rearward. Hence, when the open plate 2300 slides, the open lever 2350 may also rotate accordingly.

<Lever>

The cinching connector 80 and the cinching lever 2530 are illustrated in detail in FIGS. 11 and 12.

The cinching connector 80 may have a cable 83 of a line member such as a wire. An outer circumferential surface of the cinching connector 80 may be surrounded by a protective tube.

A catching protrusion fixing portion 82 which has a groove in the perimeter may be formed on one side of the protective tube, fitted to the cinching connector installation portion 2120 of the first housing 2110, and supported and fixed to the connector installation portion 2153*c* of the third housing 2150. A catching protrusion 81 may be formed at one end of the cable 83 and fitted to the cinching lever 2530 to be described below.

In the same manner as the one side of the protective tube, a catching protrusion fixing portion 86 which has a groove in the perimeter may be formed on other side of the protective tube and fitted to a front side of the actuator 3000 to be described below. A catching protrusion 84 may be formed at other end of the cable 83 and fitted to a cinching pull member 3430 to be described below.

Hence, when the cinching connector 80 moves, the protective tube does not move, and only the cable moves.

The cinching connector 80 may transmit a driving force of the actuator 3000 to the cinching lever 2530.

A relative position of the actuator 3000 with respect to the latch part 2000 can be freely arranged by the cinching connector 80.

The cinching lever 2530 may be entirely formed in a fan shape and fitted to the latch pivot shaft 2230, and the rear of the cinching lever 2530 may be obstructed by the reinforcement plate 2340. The cinching lever 2530 may be disposed between the first housing 2110 and the third housing 2150.

The cinching lever 2530 may include the catching member fitting portion 2531 to which the catching protrusion 81 of the cinching connector 80 is fitted, the latch catching portion 2532 in which the protrusion 2208 of the latch 2200 is caught, and a lever protrusion 2534 abutting on the rear surface of the first housing 2110.

The catching member fitting portion 2531 may be formed on the right side of the cinching lever 2530 to protrude rearward. The catching member fitting portion 2531 may be formed such that the rear, the upper part and the left side are opened.

The catching protrusion 81 may be inserted through the upper part of the catching member fitting portion 2531 and may be installed so that the cable of the cinching connector 80 is placed on the left side.

The latch catching portion 2532 may be formed on the left side of the cinching lever 2530 to protrude forward. The latch catching portion 2532 may be bent along the perimeter shape of the cinching lever 2530.

The latch catching portion 2532 may be linked with the actuator 3000, and a cinching stroke may be controlled by the actuator 3000.

The lever protrusion 2534 may be formed as an arc-shaped plate and may minimize a friction between the cinching lever 2530 and the first housing 2110.

An insertion hole 2535 to which the latch pivot shaft 2230 is fitted may be formed on the upper part of the cinching lever 2530, and the cinching lever 2530 may rotate about the insertion hole 2535. The center of the insertion hole 2535 may be disposed on the same line as the latch groove 2209 of the latch 2200.

As illustrated in FIG. 14, a reinforcement plate installation groove 2533, to which the reinforcement plate 2340 to be described below is fitted, may be formed on an upper part of the rear surface of the cinching lever 2530 to be recessed forward.

<Reinforcement Plate>

The reinforcement plate 2340 is illustrated in detail in FIGS. 13 and 14.

The reinforcement plate 2340 may be formed in a plate shape.

The reinforcement plate 2340 may include a latch pivot shaft connector 2341 coupled with the latch pivot shaft 2230 and a pivot shaft connector 2343 coupled with the pivot shaft 2380.

The pivot shaft connector 2343 may be bent and connected to the front right side of the latch pivot shaft connector 2341.

A latch pivot shaft connecting groove 2342 into which the latch pivot shaft 2230 is inserted may be formed on the left side of the latch pivot shaft connector 2341 to be penetrated in the front-rear direction.

A pivot shaft connecting groove 2344 into which the pivot shaft 2380 is inserted may be formed on the right side of the pivot shaft connector 2343 to be penetrated in the front-rear direction.

Due to the reinforcement plate 2340, the latch pivot shaft 2230 and the rear of the pivot shaft 2380 can be stably supported at a predetermined distance.

<Actuator>

Configuration of the actuator 3000 is described in detail below with reference to FIGS. 20 and 21.

The actuator 3000 may include an actuator driver installed inside the actuator 3000, a pull member that performs a sliding motion by the actuator driver, a pusher connector 70 and the cinching connector 80 that are pulled by the pull member.

The pusher connector 70 may be formed in the same manner as the cinching connector 80.

A catching protrusion 71 formed on one side of the pusher connector 70 may be fitted to a sliding member 4300 of the pusher part 4000 to be described below, and a catching protrusion fixing portion 72 may be installed in first and second pusher cases 4100 and 4200 of the pusher part 4000.

A catching protrusion 74 formed on other side of the pusher connector 70 may be fitted to the rear side of the actuator 3000, and a catching protrusion fixing portion 76 may be fitted to a pusher pull member 3440 to be described below.

Hence, when the pusher connector 70 moves, the protective tube does not move, and only the cable moves.

The pusher connector 70 may transmit the driving force of the actuator 3000 to the sliding member 4300.

The actuator driver may be installed between a first actuator case 3100 and a second actuator case 3200.

The first actuator case 3100 is illustrated in detail in FIG. 22.

The first actuator case 3100 may include an upper plate and a perimeter portion protruding downward from the upper plate.

The first actuator case 3100 may include a rear portion 3110 and a front portion 3120 that are extended in the front-rear direction, and a center portion 3130 that protrudes between the rear portion 3110 and the front portion 3120 in the left direction. That is, the first actuator case 3100 may be formed in a T-shape.

A pusher pull member guide groove 3111 may be formed on the rear portion 3110 so that the lower part is opened, and may be extended in the front-rear direction. The pusher pull member 3440 to be described below may be inserted into the pusher pull member guide groove 3111 and may slide in the front-rear direction.

A pusher connector through groove 3112 may be formed behind the rear portion 3110 such that the lower part is opened, and may be penetrated in the front-rear direction.

The pusher connector through groove 3112 may communicate with the pusher pull member guide groove 3111.

A pusher connector fixing plate 3113 and a cable installation plate 3114 may be formed in the rear of the pusher pull member guide groove 3111. The pusher connector fixing plate 3113 may be formed on the rear side more than the cable installation plate 3114.

A groove, to which the catching protrusion fixing portion 76 of the pusher connector 70 can be fixed, may be formed on the pusher connector fixing plate 3113 such that the lower part is opened, and may be penetrated in the front-rear direction. A groove, in which a cable 73 of the pusher connector 70 can be installed, may be formed on the cable installation plate 3114 such that the lower part is opened, and may be penetrated in the front-rear direction.

A cinching pull member guide groove 3121 may be formed on the front portion 3120 so that the lower part is opened and may be extended in the front-rear direction. The cinching pull member 3430 to be described below may be inserted into the cinching pull member guide groove 3121 and may slide in the front-rear direction.

A cinching connector through groove 3122 may be formed at the front of the front portion 3120 such that the lower part is opened, and may be penetrated in the front-rear direction.

The cinching connector through groove 3122 may communicate with the cinching pull member guide groove 3121.

A cinching connector fixing plate 3123 and a cable installation plate 3124 may be formed at the front of the cinching pull member guide groove 3121. The cinching connector fixing plate 3123 may be formed on the front side more than the cable installation plate 3124.

A groove, to which the catching protrusion fixing portion 86 of the cinching connector 80 can be fixed, may be formed on the cinching connector fixing plate 3123 such that the lower part is opened, and may be penetrated in the front-rear direction. A groove, in which the cable 83 of the cinching connector 80 can be installed, may be formed on the cable installation plate 3124 such that the lower part is opened, and may be penetrated in the front-rear direction.

A second gear installation groove 3131 may be formed on the right side of the center portion 3130 such that the lower part is opened. The second gear installation groove 3131 may communicate with the pusher pull member guide groove 3111 and the cinching pull member guide groove 3121.

A motor installation groove 3132 may be formed on the left side of the center portion 3130 such that the lower part is opened. The motor installation groove 3132 may communicate with the second gear installation groove 3131.

The second actuator case 3200 is illustrated in detail in FIG. 23.

The second actuator case 3200 may include a lower plate and a perimeter portion protruding upward from the lower plate.

The second actuator case 3200 may include a rear portion 3210 and a front portion 3220 that are extended in the front-rear direction, and a center portion 3230 that protrudes between the rear portion 3210 and the front portion 3220 in the left direction. That is, the second actuator case 3200 may be formed in a T-shape.

A pusher pull member guide groove 3211 may be formed on the rear portion 3210 so that the upper part is opened, and may be extended in the front-rear direction. The pusher pull member 3440 to be described below may be inserted into the pusher pull member guide groove 3211 and may slide in the front-rear direction.

Pusher pull member guide plates 3211*a* may be formed on the left and right sides of the pusher pull member guide groove 3211 to protrude upward. The pusher pull member guide plates 3211*a* may be extended in the front-rear direction. The pusher pull member guide plates 3211*a* may contact a guide member 3442 of the pusher pull member 3440 to be described below and guide a front-rear direction sliding of the guide member 3442.

A pusher connector through groove 3212 may be formed behind the rear portion 3210 such that the upper part is opened, and may be penetrated in the front-rear direction.

The pusher connector through groove 3212 may communicate with the pusher pull member guide groove 3211.

A second sensor installation plate 3213 and a pusher connector fixing plate 3214 may be formed in the rear of the pusher pull member guide groove 3211. The pusher connector fixing plate 3214 may be formed on the rear side more than the second sensor installation plate 3213.

A groove, on which a second sensor 3002 can be installed, may be formed on the second sensor installation plate 3213 such that the upper part is opened, and may be penetrated in the front-rear direction. A groove, to which the catching protrusion fixing portion 76 of the pusher connector 70 can be fixed, may be formed on the pusher connector fixing plate 3214 such that the upper part is opened, and may be penetrated in the front-rear direction.

The second sensor 3002 may be installed to be pressed from the front to the rear.

A first sensor installation plate 3215 may be formed on the left side of the pusher pull member guide groove 3211.

The first sensor installation plate 3215 may be formed in an U-shape so that a first sensor 3001 can be installed.

The first sensor 3001 may be installed to be pressed from the right to the left.

A cinching pull member guide groove 3221 may be formed on the front portion 3220 so that the upper part is opened and may be extended in the front-rear direction. The cinching pull member 3430 to be described below may be inserted into the cinching pull member guide groove 3221 and may slide in the front-rear direction.

Cinching pull member guide plates 3221*a* may be formed on the left and right sides of the cinching pull member guide groove 3221 to protrude upward. The cinching pull member guide plates 3221*a* may be extended in the front-rear direction. The cinching pull member guide plates 3221*a* may contact a guide member 3435 of the cinching pull member 3430 to the described below and guide a front-rear direction sliding of the guide member 3435.

A cinching connector through groove 3212 may be formed at the front of the front portion 3220 such that the upper part is opened, and may be penetrated in the front-rear direction.

A cinching connector through groove 3222 may communicate with the cinching pull member guide groove 3221.

A third sensor installation plate 3223 and a cinching connector fixing plate 3224 may be formed at the front of the cinching pull member guide groove 3221. The cinching connector fixing plate 3224 may be formed on the front side more than the third sensor installation plate 3223.

A groove, on which a third sensor 3003 can be installed, may be formed on the third sensor installation plate 3223 such that the upper part is opened, and may be penetrated in the front-rear direction. A groove, to which the catching protrusion fixing portion 86 of the cinching connector 80 can be fixed, may be formed on the cinching connector fixing plate 3224 such that the upper part is opened, and may be penetrated in the front-rear direction.

The third sensor 3003 may be installed to be pressed from the rear to the front.

A first gear installation groove 3231 may be formed on the right side of the center portion 3230 such that the upper part is opened. The first gear installation groove 3231 may communicate with the pusher pull member guide groove 3211 and the cinching pull member guide groove 3221.

A motor installation groove 3232 may be formed on the left side of the center portion 3230 such that the upper part is opened. The motor installation groove 3232 may communicate with the first gear installation groove 3231.

A power supply unit 3233 may be formed at the front of the center portion 3230 and supply power to a driving motor 3410 and the first, second and third sensors 3001, 3002 and 3003 through wires connected to the power supply unit 3233.

Screw coupling portions 3101 and 3201 may be protrudingly formed on the left and right sides of the outer surfaces of the rear portions 3110 and 3210 and the front portions 3120 and 3220 of the first and second actuator cases 3100 and 3200. The screw coupling portions 3101 and 3201 may have a groove in which the two screw coupling portions 3101 and 3201 can be screw-coupled.

Coupling rings 3102 may be formed on the left and right sides of the outer surface of the center portion 3130 of the first actuator case 3100, and coupling protrusions 3202 may be formed on the left and right sides of the outer surface of the center portion 3230 of the second actuator case 3200. The coupling rings 3102 may have a groove into which the coupling protrusions 3202 can be inserted.

Hence, the first actuator case 3100 and the second actuator case 3200 can be firmly fixed.

A scaling member support plate 3103 may be protrudingly formed on the lower side of the perimeter portion of the first actuator case 3100. The sealing member support plate 3103 may be inward spaced from the perimeter portion of the first actuator case 3100.

A sealing member installation groove 3203 may be formed on the upper side of the perimeter portion of the second actuator case 3200 such that an upper part is opened. A sealing member 3300 and the sealing member support plate 3103 may be inserted into the sealing member installation groove 3203.

Hence, foreign substances can be prevented from being introduced into the actuator 3000.

The sealing member 3300 may be formed of a rubber material.

Sealing member ends 3301 may be formed at the front and the rear of the sealing member 3300 to protrude upward.

The sealing member ends 3301 may be respectively fixed to the catching protrusion fixing portion 76 of the pusher connector 70 and the catching protrusion fixing portion 86 of the cinching connector 80 installed in the first and second actuator cases 3100 and 3200. Due to the sealing member ends 3301, foreign substances can be prevented from being introduced into the actuator 3000 through the pusher connector through grooves 3112 and 3212 and the cinching connector through grooves 3122 and 3222.

The actuator driver is described in detail with reference to FIG. 24.

The actuator driver may include the driving motor 3410, a first gear 3412 that is installed on a motor shaft 3411 of the driving motor 3410 and is linked to the driving motor 3410, and a second gear 3420 that is engaged with the first gear 3412 and is linked to the first gear 3412.

The pull member may include the cinching pull member 3430 that is engaged with the second gear 3420 and is linked to the second gear 3420, and the pusher pull member 3440 that is coupled to the cinching pull member 3430 and is linked to the cinching pull member 3430.

The motor shaft 3411 may be formed in the left-right direction.

The first gear 3412 may be provided as a worm gear.

The second gear 3420 may include a second gear shaft 3421, a helical gear 3422 that is formed on an outer surface of the second gear shaft 3421 and is engaged with the first gear 3412, and a female thread 3423 that is formed inside the second gear shaft 3421.

The second gear shaft 3421 may be formed in the left-right direction.

The cinching pull member 3430 may include a lead screw 3431 that is engaged with the female thread 3423 of the second gear 3420, a pusher pull member coupling portion 3432 formed in the rear of the lead screw 3431, and a cinching connector installation portion 3434 formed at the front of the lead screw 3431.

The lead screw 3431, the pusher pull member coupling portion 3432, and the cinching connector installation portion 3434 may be formed in the left-right direction.

The pusher pull member coupling portion 3432 may be formed in the shape of a cylinder.

On a lower side of an outer surface of the pusher pull member coupling portion 3432, a pusher pull member coupling groove 3433 may be formed along the perimeter of the outer surface. The pusher pull member coupling groove 3433 may have a diameter less than a diameter of the pusher pull member coupling portion 3432, and thus may be fitted to a cinching pull member coupling groove 3444 of the pusher pull member 3440 to be described below.

The cinching connector installation portion 3434 may be entirely formed in the shape of a cylinder.

The guide member 3435 may be formed to protrude to the left and right sides of the cinching connector installation portion 3434. The guide member 3435 may be provided as a plate extended in the front-rear direction.

A third sensor pressing plate 3436 may be formed to protrude to the lower side of the cinching connector installation portion 3434. The third sensor pressing plate 3436 may be formed at a position spaced from the front surface of the cinching connector installation portion 3434 so that the third sensor 3003 can be pressed.

A cinching connector installation groove 3437 may be formed such that the upper side of the cinching connector installation portion 3434 is opened. A cable installation groove 3438 may be formed at the front of the cinching connector installation portion 3434 such that the upper side is opened and it is penetrated in the front-rear direction.

A left-right direction width of the cable installation groove 3438 may be less than a left-right direction width of the cinching connector installation groove 3437.

Hence, the catching protrusion 84 of the cinching connector 80 installed in the cable installation groove 3438 does not come out of the front.

The pusher pull member 3440 may include a pusher pull member shaft 3441 that is entirely formed in the shape of a cylinder.

The guide member 3442 may be formed to protrude to the left and right sides of the pusher pull member shaft 3441. The guide member 3442 may be provided as a plate extended in the front-rear direction.

A sensor pressing portion 3443 may be formed to protrude to the lower side of the pusher pull member shaft 3441. A shape of the sensor pressing portion 3443 is illustrated in detail in FIG. 26. The sensor pressing portion 3443 may be entirely formed in a rectangular shape. A portion of the sensor pressing portion 3443 may protrude to the left. Hence, a rear side of the sensor pressing portion 3443 may press the second sensor 3002, and the protruding left side of the sensor pressing portion 3443 may press the first sensor 3001.

The sensor pressing portion 3443 may be formed at a position spaced from a rear surface of the pusher pull member shaft 3441 so that it can press the first sensor 3001 and the second sensor 3002.

A pusher connector installation groove 3445 may be formed such that the upper side of the pusher pull member shaft 3441 is opened. A cable installation groove 3446 may be formed in the rear of the pusher pull member shaft 3441 such that the upper side is opened and it is penetrated in the front-rear direction.

A left-right direction width of the cable installation groove 3446 may be less than a left-right direction width of the pusher connector installation groove 3445.

Hence, the catching protrusion 74 of the pusher connector 70 installed in the cable installation groove 3446 does not come out of the rear.

<Pusher Part>

Configuration of the pusher part 4000 is described in detail below with reference to FIGS. 31 to 33.

The pusher part 4000 may include the sliding member 4300 that is linked to the pusher connector 70 and slides in the up-down direction, a rotation lever 4500 that rotates by the sliding of the sliding member 4300, and a pusher 4400 that slides by the rotation of the rotation lever 4500 and pushes the vehicle door in a direction in which the vehicle door is opened.

The sliding member 4300, the rotation lever 4500, and the pusher 4400 may be disposed between the first pusher case 4100 and the second pusher case 4200.

The first pusher case 4100 may include a front portion and a perimeter portion that is formed around the front portion and protrudes rearward. That is, the first pusher case 4100 may be formed such that the rear is opened.

A protrusion 4102*b* may be formed on a front surface of the first pusher case 4100 to protrude outward. The protrusion 4102*b* may include an upper protrusion and a lower protrusion that are formed in the left-right direction, a left protrusion that connects left ends of the upper protrusion and the lower protrusion, and a reinforcement protrusion that connects the upper protrusion and the lower protrusion in an X-shape.

The protrusion 4102*b* may be inserted into the pusher installation groove 2131 of the second housing 2130, and the first pusher case 4100 does not move in the left direction and in the up-down direction.

The first pusher case 4100 may be disposed on the left side of the first housing 2110, and the right side of the first pusher case 4100 may be blocked by the first housing 2110. Hence, the first pusher case 4100 does not move to the right.

A pusher guide portion 4104 may be formed on the upper right side of the first pusher case 4100 to protrude rearward. The pusher guide portion 4104 may be formed in a rectangular parallelepiped shape. The pusher guide portion 4104 may be spaced from a right surface of the perimeter portion of the first pusher case 4100.

Hence, a pusher insertion groove 4101 may be formed between a right surface of the pusher guide portion 4104 and the right surface of the perimeter portion of the first pusher case 4100 such that the rear is opened and it is penetrated in the up-down direction.

A return spring support portion 4105 may be formed on the left side of the pusher guide portion 4104 to protrude rearward. The return spring support portion 4105 may be formed in a rectangular parallelepiped shape. The return spring support portion 4105 may be spaced from the left side of the pusher guide portion 4104.

Hence, a first end 4511 of a rotation lever return spring 4510 to be described below may hang on a right surface of the return spring support portion 4105.

A sliding member insertion groove 4106*a* may be formed on the left side of the first pusher case 4100 such that the rear is opened. The sliding member 4300 may be installed in the sliding member insertion groove 4106*a* and may slide in the up-down direction.

A pusher connector installation groove 4106*b* may be formed on a lower part of the sliding member insertion groove 4106*a*. The pusher connector installation groove 4106*b* may be formed such that the lower part is opened, and may communicate with the sliding member insertion groove 4106*a*. The catching protrusion fixing portion 72 of the pusher connector 70 may be fixed to the pusher connector installation groove 4106*b*.

A barrier rib may be formed on the right side of the sliding member insertion groove 4106*a*. A rotation lever insertion groove 4107 may be formed on the barrier rib to be penetrated in the left-right direction. The rotation lever insertion groove 4107 may communicate with the sliding member insertion groove 4106*a*.

A portion of the rotation lever 4500 may be disposed inside the sliding member insertion groove 4106*a* through the rotation lever insertion groove 4107 and may be installed on the sliding member 4300.

A rotation lever rotation shaft 4108 may be formed to forward protrude to the right more than the rotation lever insertion groove 4107.

As illustrated in FIG. 36, a first guide protrusion 4109*a* may be formed on the right side of the first pusher case 4100 to protrude rearward. The first guide protrusion 4109*a* may be extended in the up-down direction and disposed on the same line as the pusher insertion groove 4101.

As illustrated in FIG. 34, a second guide protrusion 4109*b* may be formed on the left side of the first pusher case 4100 to protrude rearward. The second guide protrusion 4109*b* may be extended in the up-down direction and disposed inside the sliding member insertion groove 4106*a*.

The second pusher case 4200 may include a rear plate and a perimeter portion that is formed around the rear plate and protrudes forward.

The perimeter portion of the second pusher case 4200 may surround the perimeter portion of the first pusher case 4100.

A pusher insertion groove 4201 that is opened forward and is penetrated in the up-down direction may be formed on the upper right side of the second pusher case 4200.

The pusher insertion groove 4201 of the second pusher case 4200 may communicate with the pusher insertion groove 4101 of the first pusher case 4100.

The second pusher case 4200 may include a rotation shaft fixing groove 4204 into which the rotation lever rotation shaft 4108 of the first pusher case 4100 can be inserted. The rotation shaft fixing groove 4204 may be penetrated in the front-rear direction.

A pusher connector insertion groove 4205 may be formed on the lower left side of the second pusher case 4200 such that the front is opened and it is penetrated in the up-down direction.

A plurality of coupling protrusions 4102*a* may be formed on the perimeter portion of the first pusher case 4100 to protrude outward.

A plurality of coupling rings 4202 may be formed on the perimeter portion of the second pusher case 4200 to protrude outward. The coupling protrusions 4102*a* may be inserted into the coupling rings 4202, and thus the first pusher case 4100 and the second pusher case 4200 may be hook-coupled to each other.

A plurality of screw coupling grooves 4103 may be formed on the upper part and the lower part of the first pusher case 4100 to be penetrated in the front-rear direction.

A plurality of screw coupling bosses 4203 may be formed on the upper part and the lower part of the second pusher case 4200 to protrude forward. The screw coupling bosses 4203 may be disposed at a position capable of being screw-coupled with the screw coupling grooves 4103.

Hence, the first pusher case 4100 and the second pusher case 4200 can be firmly coupled to each other.

The sliding member 4300 may be entirely formed in a rectangular parallelepiped shape that is elongated in the up-down direction.

A screw coupling boss insertion groove 4301 may be formed on the upper part of the sliding member 4300 and engaged with the screw coupling boss 4203 formed on the upper left side of the second pusher case 4200. Hence, the sliding member 4300 does not slide to the upper part more than the screw coupling boss 4203.

An inner space, of which the rear and the left-right direction are is opened, may be formed between the upper part and the lower part of the sliding member 4300.

A first rotation lever insertion protrusion 4303 may be formed in the inner space to protrude rearward. That is, a portion of the rotation lever 4500 may be inserted into the inner space, and the rotation lever 4500 may be coupled to the first rotation lever insertion protrusion 4303.

A rotation lever catching plate 4302 may be formed on the upper part of the sliding member 4300.

The rotation lever catching plate 4302 may protrude in a direction of the inner space of the sliding member 4300.

A pusher connector installation groove 4304, in which the pusher connector 70 is installed from the rear to the front, may be formed on the lower part of the sliding member 4300.

A guide groove 4305 may be formed at the front of the sliding member 4300 such that the front is opened and it is penetrated in the up-down direction.

A second guide protrusion 4109*b* of the first pusher case 4100 may be inserted into the guide groove 4305, and the sliding member 4300 may slide along the second guide protrusion 4109*b* in the up-down direction.

The pusher 4400 may be formed in a form in which a rectangular parallelepiped formed on the upper part and a rectangular parallelepiped formed on the lower part are combined.

Horizontal and vertical lengths of the rectangular parallelepiped formed on the upper part of the pusher 4400 may be shorter than horizontal and vertical lengths of the rectangular parallelepiped formed on a lower part of the pusher 4400.

The rectangular parallelepiped formed on the upper part of the pusher 4400 may be covered by a pusher cover 4450.

The pusher cover 4450 may be formed in a rectangular parallelepiped shape.

Horizontal and vertical lengths of the pusher cover 4450 may be similar or equal to the horizontal and vertical lengths of the rectangular parallelepiped formed on the lower part of the pusher 4400.

A cover coupling protrusion 4405 may be formed on a left side surface and a right side surface of the rectangular parallelepiped formed on the upper part of the pusher 4400 to protrude outward.

A cover coupling groove 4453 that is penetrated in the left-right direction may be formed on a left side surface and a right side surface of the pusher cover 4450 and may be coupled with the cover coupling protrusion 4405.

An installation groove 4401 may be formed in the pusher 4400 such that it is opened forward and is penetrated in the up-down direction.

A door open button 4402 and a door open sensor 4403 may be installed on the installation groove 4401.

A door open button protruding groove 4451 that is penetrated in the up-down direction may be formed in an upper part of the pusher cover 4450, and the door open button 4402 may be installed to protrude to the upper part of the pusher cover 4450. When the pusher 4400 slides on the upper part of the pusher cover 4450, the pusher cover 4450 may push the vehicle body, and the vehicle door may move in the direction in which the vehicle door is opened.

The door open sensor 4403 may be disposed at a lower part of the door open button 4402 and may be pressed when the door open button 4402 is pressed downward while opening the vehicle door. Hence, the door open sensor 4403 can detect that the vehicle door has been opened, by the door open button 4402.

A lower part of the installation groove 4401 may communicate with a guide groove 4452 that is formed such that the front is opened to a front surface of the pusher cover 4450 and is penetrated in the up-down direction.

The first guide protrusion 4109*a* of the first pusher case 4100 may be fitted to the lower part of the installation groove 4401 and the guide groove 4452, and the pusher 4400 and the pusher cover 4450 may slide in the up-down direction along the first guide protrusion 4109*a*.

The lower part of the pusher 4400 may have an internal space so that the rear, the left-right direction, and the lower part are opened.

A second rotation lever insertion protrusion 4404 may be formed in the internal space to protrude rearward.

A portion of the rotation lever 4500 may be inserted into the internal space and coupled to the second rotation lever insertion protrusion 4404.

The rotation lever 4500 may be formed in a bar shape.

A pivot shaft installation groove 4501 that is penetrated in the front-rear direction may be formed in the center of the rotation lever 4500 and may be fitted to the rotation lever rotation shaft 4108 of the first pusher case 4100.

A boss may be formed in front of the pivot shaft installation groove 4501. The boss may be extended enough to contact the rear surface of the first pusher case 4100. The rotation lever return spring 4510 may be installed in the boss.

The rotation lever return spring 4510 may be provided as a coil spring.

The first end 4511 of the rotation lever return spring 4510 may be supported at the right side of the return spring support portion 4105 of the first pusher case 4100, and a second end 4512 may be bent toward the rotation lever 4500 and may hang on an upper surface of the rotation lever 4500.

A first protrusion insertion groove 4502 that is penetrated in the front-rear direction may be formed on the right side of the rotation lever 4500 and may be fitted to the second rotation lever insertion protrusion 4404 of the pusher 4400.

A second protrusion insertion groove 4503 that is penetrated in the front-rear direction may be formed on the left side of the rotation lever 4500 and may be fitted to the first rotation lever insertion protrusion 4303 of the sliding member 4300.

A separation plate 4504 may be formed at the rotation lever 4500 to protrude forward. The separation plate 4504 may be extended enough to contact the rear surface of the first pusher case 4100.

Based on the center of the rotation lever 4500, the pivot shaft installation groove 4501 may be disposed on the left side of the center, and the separation plate 4504 may be disposed on the right side of the center.

The rotation lever 4500 may not move forward due to the separation plate 4504 and the boss formed in front of the pivot shaft installation groove 4501.

<Cinching Driving Method>

With reference to FIGS. 15 to 19, a cinching driving method in the latch part 2000 is described below.

As illustrated in FIG. 15, a state in which the striker 2001 is outside the latch part 2000 is referred to as an initial state. In this instance, the latch 2200 does not rotate by the striker 2001, and the third sensor transfer member 2911 and the fourth sensor transfer member 2912 are not pressed by the latch 2200.

As illustrated in FIGS. 16 and 17, when the striker 2001 is inserted into the locking groove 2201 of the latch 2200 through the striker insertion groove 2105, the latch 2200 may rotate clockwise.

When the vehicle door is closed while the first locking catching portion 2202*a* of the latch 2200 is caught in the locking portion 2371 of the pivoting member 2370, only the fourth sensor transfer member 2912 may be pressed by the latch 2200.

When the fourth sensor transfer member 2912 is pressed and the third sensor transfer member 2911 is not pressed, the controller may recognize this as a state in which the vehicle door is incompletely closed, and may pull the cinching connector 80 using the actuator 3000 so as to perform the cinching function.

So, as illustrated in FIGS. 18 and 19, the cinching lever 2530 may rotate clockwise by the cinching connector 80.

When the cinching lever 2530 rotates clockwise, the latch catching portion 2532 of the cinching lever 2530 may rotate the latch 2200 clockwise, and the second locking catching portion 2201*a* of the latch 2200 may be caught in the locking portion 2371 of the pivoting member 2370. In this instance, the third sensor transfer member 2911 and the fourth sensor transfer member 2912 may be pressed by the latch 2200, and the controller may recognize this as a state in which the vehicle door is completely closed, and may return the cinching connector 80 to its originals state.

With reference to FIGS. 25 to 28, a cinching driving method in the actuator 3000 is described below.

As illustrated in FIGS. 25 and 26, a state in which both the catching protrusion 74 of the pusher connector 70 and the catching protrusion 81 of the cinching connector 80 are not pulled is referred to as an initial state.

In this instance, the first sensor 3001 may be maintained in a depressed state by the sensor pressing portion 3443 of the pusher pull member 3440.

When the cinching function is performed by the controller, the driving motor 3410 may rotate. When the driving motor 3410 rotates, the first gear 3412 may rotate along the driving motor 3410. Further, when the first gear 3412 rotates, the second gear 3420 engaged with the first gear 3412 may rotate.

As illustrated in FIGS. 27 and 28, when the second gear 3420 rotates, the lead screw 3431 engaged with the second gear 3420 may slide rearward.

Hence, the cinching pull member 3430 provided with the lead screw 3431 can slide rearward, and the catching protrusion 84 of the cinching connector 80 can be pulled rearward.

As the cinching pull member 3430 slides rearward, the pusher pull member 3440 coupled with the cinching pull member 3430 may also slide rearward.

Hence, the sensor pressing portion 3443 of the pusher pull member 3440 can deviate from the first sensor 3001 and can press the second sensor 3002.

When the second sensor 3002 is pressed, the driving motor 3410 may stop working.

Since the catching protrusion 84 installed in the actuator 3000 and the catching protrusion 81 installed in the cinching lever 2530 are connected to each other through the cable 83, the catching protrusion 81 installed in the cinching lever 2530 may also be pulled toward the actuator 3000 and rotate the cinching lever 2530.

In this instance, the pusher connector installation groove 3445 of the pusher pull member 3440 may be sufficiently extended in the front-rear direction so that it does not affect the catching protrusion 74 of the pusher connector 70.

When the controller recognizes that the vehicle door is completely closed, the driving motor 3410 may rotate in the opposite direction and returns the cinching pull member 3430 to the initial state.

<Pusher Driving Method>

With reference to FIGS. 34 to 37, a pusher driving method in the pusher part 4000 is described below.

As illustrated in FIGS. 34 and 35, a state in which the pusher connector 70 is not pulled is referred to as an initial state.

When a signal to perform a door open function is transmitted to the controller while the latch part 2000 is unlocked, the pusher connector 70 may be pulled.

As illustrated in FIGS. 36 and 37, when the pusher connector 70 is pulled, the sliding member 4300 in which the catching protrusion 71 of the pusher connector 70 is installed may slide downward.

When the sliding member 4300 slides downward, one side of the rotation lever 4500 may be forced downward, and the rotation lever 4500 may rotate counterclockwise. Further, other side of the rotation lever 4500 may transmit a force upward, and the pusher 4400 may slide upward.

In this instance, when the rotation lever 4500 turns counterclockwise, the second end 4512 of the rotation lever return spring 4510 may approach the first end 4511, and the rotation lever return spring 4510 may be retracted.

The user may push the vehicle door in the direction in which the vehicle door opens while the pusher 4400 protrudes more upward than the first and second pusher cases 4100 and 4200. A gap may be formed between the vehicle door and the vehicle body to the extent that the user can put his/her hand.

In this instance, the door open button 4402 may press the door open sensor 4403 while the door open button 4402 of the pusher 4400 is pressed.

Afterwards, when the user puts his/her hand in the gap and opens the vehicle door enough to allow the user to enter, an external force applied to the door open button 4402 of the pusher 4400 is removed. Therefore, the door open button 4402 returns to its original state, and the door open sensor 4403 is not pressed.

When the signal from the door open sensor 4403 disappears, the controller may recognize that the vehicle door has been opened, rotate the actuator 3000 in the reverse direction, and return the pusher connector 70 to the initial state.

When the pusher connector 70 is returned to the initial state, the pusher part 4000 is returned to its original state by an elastic restoring force of the rotation lever return spring 4510.

With reference to FIGS. 25 and 26 and FIGS. 29 and 30, the pusher driving method in the actuator 3000 is described below.

As illustrated in FIGS. 25 and 26, a state in which both the catching protrusion 74 of the pusher connector 70 and the catching protrusion 81 of the cinching connector 80 are not pulled is referred to as an initial state.

In this instance, the first sensor 3001 may be maintained in a depressed state by the sensor pressing portion 3443 of the pusher pull member 3440.

When the pusher function is performed by the controller, the driving motor 3410 may rotate in the opposite direction to when the cinching function is performed. When the driving motor 3410 rotates, the first gear 3412 may rotate along the driving motor 3410. Further, when the first gear 3412 rotates, the second gear 3420 engaged with the first gear 3412 may rotate.

As illustrated in FIGS. 29 and 30, when the second gear 3420 rotates, the lead screw 3431 engaged with the second gear 3420 may slide forward.

Hence, the cinching pull member 3430 provided with the lead screw 3431 and the pusher pull member 3440 coupled with the cinching pull member 3430 may slide forward, and the catching protrusion 74 of the pusher connector 70 may be pulled forward. Further, the sensor pressing portion 3443 of the pusher pull member 3440 may deviate from the first sensor 3001, and the third sensor pressing plate 3436 of the cinching pull member 3430 may press the third sensor 3003.

When the third sensor 3003 is pressed, the driving motor 3410 may stop rotating.

Since the catching protrusion 74 installed in the actuator 3000 and the catching protrusion 71 installed in the pusher part 4000 are connected to each other through the cable 73, the catching protrusion 71 installed in the pusher part 4000 may also be pulled toward the actuator 3000 and may slide downward the sliding member 4300.

In this instance, the cinching connector installation groove 3437 of the cinching pull member 3430 may be sufficiently extended in the front-rear direction so that it does not affect the catching protrusion 84 of the cinching connector 80.

As described above, when the controller checks that the vehicle door opens, the driving motor 3410 may rotate in the opposite direction and return the pusher pull member 3440 to the initial state.

As described above, the first embodiment of the present disclosure can operate only the cinching function by removing the pusher connector 70 and the pusher part 4000 that is connected to the pusher connector 70 and is installed in the second housing 2130.

Because the pusher part 4000 is modularized, the user can easily remove the pusher function, if necessary or desired.

Second Embodiment

As illustrated in FIG. 38, an electric latch (E-latch) for vehicle door according to a second embodiment of the present disclosure may include an actuator 3000 connected to a latch part 2000' locking or unlocking a vehicle door, and a pusher part 5000 that is connected to the actuator 3000 and creates a space to grab the vehicle door by making a distance between the vehicle door and a vehicle body.

The actuator 3000 and the pusher part 5000 may be connected by a pusher connector 90.

In the second embodiment of the present disclosure, structures and components identical or equivalent to those described in the first embodiment are designated with the same or similar reference numerals, and a further description may be briefly made or may be entirely omitted.

Configuration of the latch part 2000' according to the second embodiment of the present disclosure is substantially the same as configuration of the latch part 2000 according to the first embodiment of the present disclosure, except for a second housing 2160.

The second housing 2160 is illustrated in detail in FIGS. 39 and 40.

The second housing 2160 may be formed in a plate shape.

The right side of the second housing 2160 may be substantially the same as the right side of the second housing 2130 according to the first embodiment of the present disclosure.

A pusher installation groove 2161 that is penetrated in a front-rear direction may be formed in the left side of the second housing 2160. A boss may be formed in the rear of the pusher installation groove 2161.

A fifth protrusion 2163 may be formed on the left side of the second housing 2160 in an arc shape centered on the pusher installation groove 2161 to protrude rearward.

The boss formed in the rear of the pusher installation groove 2161 and the fifth protrusion 2163 may protrude rearward with the same length. The boss formed in the rear of the pusher installation groove 2161 and the fifth protrusion 2163 may abut on a front surface of the pusher part 5000 to be described below to reduce a friction force between the pusher part 5000 and the second housing 2160.

A pusher connector installation member 2168 that is bent rearward may be formed at a left end of the second housing 2160.

The pusher connector installation member 2168 may be formed on a lower part of the second housing 2160.

A pusher connector installation groove 2169 of which the rear is opened may be formed in the pusher connector installation member 2168.

The pusher part 5000 is illustrated in detail in FIGS. 39 and 40.

The pusher part 5000 may include a rotation lever 5100 rotatably installed on the second housing 2160, and a door open roller 5110 that is installed on one side of the rotation lever 5100 and pushes the vehicle door in a direction in which the vehicle door opens.

The rotation lever 5100 may include a first plate formed in a left-right direction and a second plate formed on the right side of the first plate to protrude downward.

A pivot shaft insertion groove 5101 that is penetrated in the front-rear direction may be formed at a point where the first plate and the second plate of the rotation lever 5100 meet.

The pivot shaft insertion groove 5101 and the pusher installation groove 2161 of the second housing 2160 may communicate with each other and may be coupled by a pivot shaft 5120.

That is, the rotation lever 5100 may be rotatably installed on the pivot shaft 5120.

A catching protrusion installation member 5102 that is bent rearward may be formed on a lower part of the second plate of the rotation lever 5100.

A lower end of the catching protrusion installation member 5102 may be bent to the right side. That is, the catching protrusion installation member 5102 may be formed in an L-shape.

A catching protrusion installation groove 5103 that has an opened lower part and is penetrated in the left-right direction may be formed in the catching protrusion installation member 5102. A width of the catching protrusion installation groove 5103 may be greater than a width of a cable 93 of the pusher connector 90 to be described below and may be less than a diameter of a catching protrusion 91.

Hence, when the catching protrusion 91 is installed in the catching protrusion installation groove 5103, the catching protrusion 91 does not retreat to the lower and the left due to the shape of the catching protrusion installation member 5102. The catching protrusion 91 may be pulled to the left as illustrated in FIGS. 41 and 42.

The door open roller 5110 may be formed in a disc shape.

The door open roller 5110 may be rotatably installed on the rotation lever 5100.

Hence, when the rotation lever 5100 rotates, the door open roller 5110 may roll along the inner surface of the vehicle door and smoothly push the vehicle door in a direction in which the vehicle door opens.

The pusher connector 90 according to the second embodiment of the present disclosure may be entirely similar to the pusher connector 70 according to the first embodiment of the present disclosure.

The catching protrusion 91 formed on one side of the pusher connector 90 may be fitted to the rotation lever 5100, and a catching protrusion fixing portion 92 may be installed in the second housing 2160.

A catching protrusion return spring 95 may be installed between the catching protrusion 91 and the catching protrusion fixing portion 92. That is, the catching protrusion return spring 95 may be installed between the catching protrusion installation member 5102 of the rotation lever 5100 and the pusher connector installation member 2168 of the second housing 2160.

Other side of the pusher connector 90 may be installed at the actuator 3000 in the same manner as the pusher connector 70 according to the first embodiment of the present disclosure.

The pusher connector 90 may transmit a driving force of the actuator 3000 to the rotation lever 5100.

With reference to FIGS. 41 and 42, a pusher driving method in the pusher part 5000 is described below.

A pusher driving method in the actuator 3000 in the second embodiment of the present disclosure may be substantially the same as the driving method in the first embodiment of the present disclosure.

As illustrated in FIG. 41, a state in which the pusher connector 90 is not pulled by the actuator 3000 is referred to as an initial state.

When a signal to perform a door open function is transmitted to the controller while the latch part 2000' is unlocked, the actuator 3000 may operate and pull the pusher connector 90.

As illustrated in FIG. 42, when the pusher connector 90 is pulled to the left, the rotation lever 5100 may rotate clockwise around the pivot shaft 5120.

When the rotation lever 5100 rotates clockwise, the door open roller 5110 may protrude upward and push the vehicle door in a direction in which the vehicle door opens. At the same time, the catching protrusion installation member 5102 may approach the pusher connector installation member 2168, and the catching protrusion return spring 95 may be retracted.

When the pusher connector 90 is pulled and a third sensor 3003 of the actuator 3000 is pressed, the driving motor 3410 stops working. After a predetermined time has passed, the driving motor 3410 may rotate in the opposite direction, and the pusher connector 90 may be returned to the initial state.

When the pusher connector 90 is returned to the initial state, the catching protrusion return spring 95 may push the catching protrusion installation member 5102 of the rotation lever 5100 by an elastic restoring force of the catching protrusion return spring 95, and the rotation lever 5100 may be returned to the original state.

It is apparent to those skilled in the art that the present disclosure can be embodied in other specific forms without departing from the spirit and essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. An electric latch for installation in a vehicle door of a vehicle body, the electric latch comprising:

an actuator;

a latch part, wherein the latch part, when installed, is arranged to pull the vehicle door towards an inside of the vehicle body by a driving force of the actuator until the vehicle door is completely closed when the vehicle door is incompletely closed;

a pusher part, wherein the pusher part, when installed, is arranged to push the vehicle door towards an outside of the vehicle body by the driving force of the actuator so as to form a gap between the vehicle door and the vehicle body when the vehicle door opens;

an actuator driver installed in the actuator;

a pull member performing a sliding motion by the actuator driver, the pull member including a cinching pull member linked to the actuator driver, and a pusher pull member coupled to the cinching pull member and linked to the cinching pull member;

a cinching connector connected to the cinching pull member and the latch part, the cinching connector transmitting the driving force of the actuator to the latch part; and a pusher connector connected to the pusher pull member and the pusher part, the pusher connector transmitting the driving force of the actuator to the pusher part, wherein the pull member selectively transmits the driving force of the actuator to the latch part or the pusher part, wherein the latch part includes:

a latch part housing;

a latch pivotally installed on the latch part housing and coupled to the vehicle body;

a pivoting member locking or unlocking the latch; and a cinching lever configured to rotate the latch in a direction in which the vehicle door is pulled to the inside of the vehicle body, wherein the cinching connector is connected to the cinching lever, and the cinching lever rotates when the driving force of the actuator is transmitted to the cinching connector, wherein the pusher part includes:

a pusher part housing;

a rotation lever pivotally installed on the pusher part housing;

a pusher connected to one side of the rotation lever and configured to slide in a direction in which the vehicle door opens; and a sliding member connected to another side of the rotation lever and configured to slide in an opposite direction to the direction in which the pusher slides, wherein the pusher connector is connected to the sliding member, and the sliding member slides when the driving force of the actuator is transmitted to the pusher connector.

2. The electric latch for vehicle door of claim 1, wherein the pusher includes a door open button abutting on the vehicle door and a door open sensor that is able to be pressed by the door open button, wherein when the door open button is pressed by the vehicle body, the door open sensor is pressed by the door open button and checks an open state of the vehicle door.

* * * * *